(12) United States Patent
Busch

(10) Patent No.: US 8,631,861 B1
(45) Date of Patent: Jan. 21, 2014

(54) PACKING UNIT FOR RECIPROCATING PUMP POLISHED ROD

(76) Inventor: Randolph A Busch, Wimberley, TX (US)

( * ) Notice: Subject to any disclaimer, the term of this patent is extended or adjusted under 35 U.S.C. 154(b) by 437 days.

(21) Appl. No.: 13/090,177

(22) Filed: Apr. 19, 2011

Related U.S. Application Data

(63) Continuation-in-part of application No. 12/491,592, filed on Jun. 25, 2009, now abandoned.

(60) Provisional application No. 61/133,129, filed on Jun. 25, 2008.

(51) Int. Cl.
*E21B 19/00* (2006.01)

(52) U.S. Cl.
USPC .......................... 166/84.4; 166/84.2; 166/84.1

(58) Field of Classification Search
USPC ........... 166/75.11, 84.1, 84.2, 84.4, 85.5, 105
See application file for complete search history.

(56) References Cited

U.S. PATENT DOCUMENTS

| | | | | |
|---|---|---|---|---|
| 2,119,244 A * | 5/1938 | Pranger | | 277/506 |
| 4,889,184 A * | 12/1989 | Lugtmeier et al. | | 166/84.1 |
| 5,343,944 A * | 9/1994 | Bassinger | | 166/84.4 |
| 5,538,080 A * | 7/1996 | Bassinger | | 166/84.2 |
| 5,636,688 A * | 6/1997 | Bassinger | | 166/84.4 |
| 5,711,533 A * | 1/1998 | Angelo et al. | | 277/329 |
| 5,878,812 A * | 3/1999 | Heinonen et al. | | 166/85.4 |
| 6,000,469 A * | 12/1999 | Bassinger | | 166/84.1 |
| 6,412,783 B1 * | 7/2002 | Finnestad | | 277/329 |
| 6,637,509 B2 * | 10/2003 | Farquharson et al. | | 166/84.1 |
| 7,284,602 B2 * | 10/2007 | Tessier et al. | | 166/84.1 |
| 7,343,969 B1 * | 3/2008 | Busch et al. | | 166/84.4 |
| 2003/0184019 A1 * | 10/2003 | Rimmer | | 277/323 |

* cited by examiner

*Primary Examiner* — Brad Harcourt
*Assistant Examiner* — Michael Wills, III

(57) ABSTRACT

A packing unit is provided for use with a well having a reciprocating pump and polished rod. Packing assembly seals, a barrier fluid and a pressure transmitter cooperate with housed components to regulate the pressure on either side of a first packing sub-assembly and to pressure one side of a second packing sub-assembly. The barrier fluid is contained above the first packing sub-assembly and below the second packing sub-assembly with well fluids and accompanying pressures being contained below the first packing sub-assembly, such that, if leakage occurs, relatively clean barrier fluids are leaked instead of well fluids. The well fluids pressure and barrier fluid pressure are substantially balanced across the first packing sub-assembly. The first packing sub-assembly and second packing sub-assembly include components allowing their respective packing seals to move with, and remain sealed against, the polished rod when it deviates angularly or translationally from the initial vertical orientation.

17 Claims, 44 Drawing Sheets

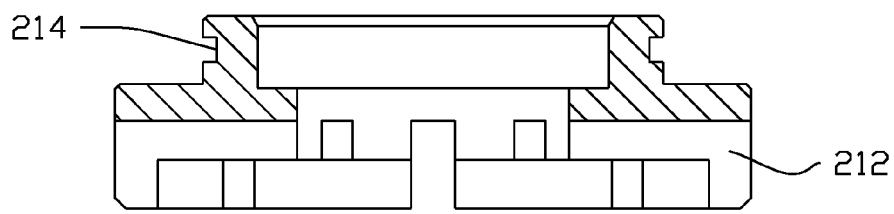
Fig. 14          Prior Art
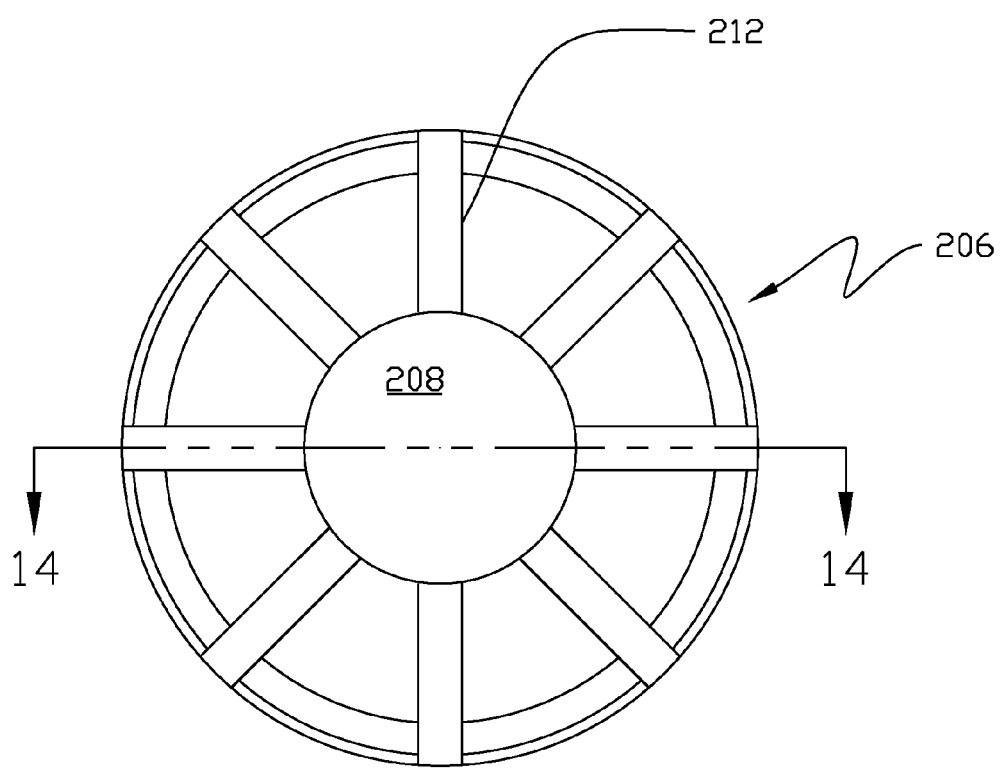
Fig. 13          Prior Art

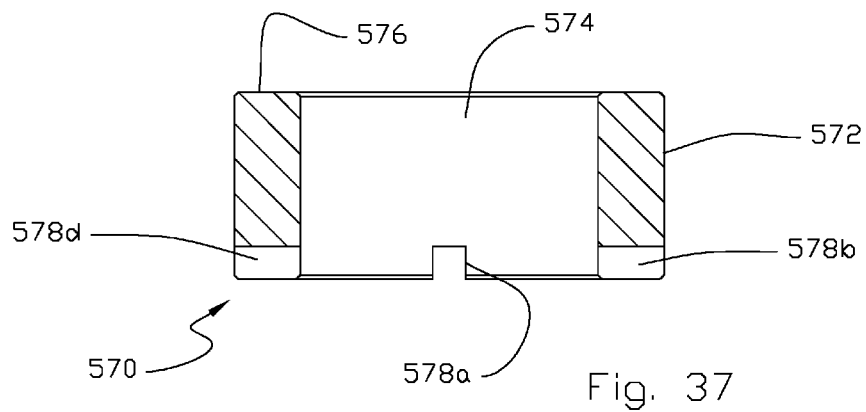
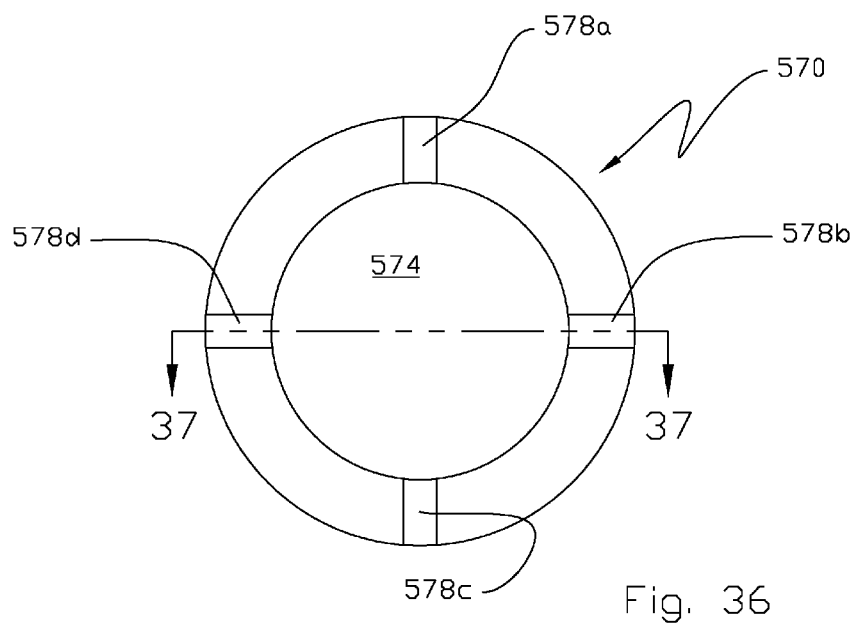

PACKING UNIT FOR RECIPROCATING PUMP POLISHED ROD

CROSS-REFERENCE TO RELATED APPLICATION

This application is a CIP of and claims priority from U.S. patent application Ser. No. 12/491,592 filed Jun. 25, 2009 now abandoned, by the inventor herein, said application claiming the benefit of U.S. Provisional Patent Application Ser. No. 61/133,129, filed Jun. 25, 2008, by the inventor herein, Randolph A. Busch, such applications being incorporated herein by reference, for all purposes.

BACKGROUND OF THE INVENTION

1. Field of the Invention

The field of the invention is reciprocating pump polished rod packing seals.

2. Description of Related Art

Over 75 percent of artificially lifted producing oil wells are being produced with sucker rod pumping systems, with the sucker rod string terminating in a polished rod that extends from the well head to the atmosphere. Stuffing boxes, having packing seals about the polished rod, are utilized to prevent well fluids from escaping around the polished rod. Well fluids include corrosive hydrocarbons including salt water and natural gas.

Due to the wear and tear of the moving polished rod, the corrosiveness of some well fluids, and the pressure drop across the packing seal in the stuffing box, all stuffing boxes on sucker rod pumping systems will leak at some time, requiring the primary packing seals in conventional stuffing boxes to be replaced periodically.

U.S. Pat. No. 7,343,969 to Palmour and the inventor herein has addressed these difficulties to a substantial extent, as discussed therein. The Palmour device would benefit, however, from an enhanced ability of the secondary packing arrangement of the Palmour device to accommodate lateral movement of the polished rod, and inclination of the polished rod from vertical.

What is needed is a more simplified, unique, flexible, pressure-regulating packing unit in a unitized assembly as a replacement for any manufacturer's stuffing box in the field or on new installations, with enhanced ability to accommodate lateral movement of the polished rod and inclination of the polished rod from vertical.

SUMMARY OF THE INVENTION

The present invention overcomes the shortcomings of the prior art by enhancing the ability of the Palmour-Busch secondary packing arrangement to accommodate lateral polished rod motion, and inclination of the polished rod from vertical. A flexible ring allows a floating portion, a packing ring cylinder, to be suspended and move with the polished rod, maintaining a centered condition regardless of pressure, and allowing angular, as well as translational, displacement of the polished rod. Sliding surfaces which would generate friction forces have been eliminated.

In some exemplary embodiments of my invention, I have provided, for a well producing well fluids, and in combination with a reciprocating plunger type pump having a polished rod, and a stuffing box through which the polished rod moves, the stuffing box having a stuffing box packing seal, a secondary packing arrangement, through which the polished rod moves, the secondary packing arrangement, comprising: a housing having a chamber; a packing assembly, positioned within the housing chamber, through which the polished rod moves, the packing assembly having: a packing assembly top portion having at least one packing seal element for sealing against the polished rod, the top portion being sealed against the housing; a packing assembly center portion, the center portion having: a floating portion, a fixed portion and a flexible portion, the floating portion having at least one packing seal element for sealing against the polished rod, the flexible portion attaching the floating portion to the fixed portion, the fixed portion being sealed against the housing, the floating, flexible and fixed portions cooperating to divide the housing chamber into an upper chamber and a lower chamber, the well fluids being received in the housing lower chamber, the well fluids pressurably engaging the packing assembly center portion, the flexible portion responding to variations in polished rod orientation such that the floating portion at least one packing seal element remains substantially sealed against the polished rod; and a bottom portion, the bottom portion retaining the floating portion within the housing, the housing upper chamber containing a barrier fluid, the barrier fluid pressurably engaging the packing assembly center portion; and a pressure transmitter having a cylinder and a piston within the cylinder, the cylinder having a well fluid communication end, the well fluid communication end fluidically communicating with the housing lower chamber such that well fluid pressures the piston, the cylinder having a barrier fluid communication end, the barrier fluid communication end fluidically communicating with the housing upper chamber, such that the barrier fluid pressurably engages the piston; the piston being sized such that the pressure from the well fluid on the piston is transmitted to the barrier fluid, the barrier fluid being pressured in the housing upper chamber to oppose the well fluid pressure on the packing assembly center portion.

In some exemplary embodiments, the barrier fluid pressure and the well fluid pressure are substantially balanced across the packing assembly center portion.

In some exemplary embodiments, the barrier fluid pressure is not less than the well fluid pressure, across the packing assembly center portion.

In some exemplary embodiments, the well fluid is routed from the housing lower chamber to the pressure transmitter cylinder well fluid communication end.

In some exemplary embodiments, the well has a flow line transporting produced well fluids, and further the well fluid is routed from the well flow line to the pressure transmitter cylinder well fluid communication end.

In some exemplary embodiments, the well has a casing, the well accumulating pressured gas in the casing, and further the well fluid is routed from the casing to the pressure transmitter cylinder well fluid communication end.

In some exemplary embodiments, the barrier fluid is selected from the group consisting of hydrocarbon based, vegetable based, and animal fat based fluids.

In some exemplary embodiments, the pressure transmitter comprises means for adding additional barrier fluid.

In some exemplary embodiments, the pressure transmitter cylinder well fluid communication end has a hole, and further comprising a rod attached to the pressure transmitter cylinder piston, the rod extruding through the cylinder well fluid communication end hole, such that, as the amount of barrier fluid in the cylinder barrier fluid communication end and the housing upper chamber decreases, the rod extrusion from the cylinder is decreased.

In some exemplary embodiments, the rod includes indicia related to the amount of barrier fluid.

In some exemplary embodiments, the pressure transmitter cylinder barrier fluid communication end has a hole, and further comprising a rod attached to the pressure transmitter cylinder barrier fluid piston, the rod extruding through the cylinder barrier fluid communication end hole, such that, as the amount of barrier fluid in the cylinder barrier fluid communication end and the housing upper chamber decreases, the rod extrusion from the cylinder is increased.

In some exemplary embodiments, the rod includes indicia related to the amount of barrier fluid.

In some exemplary embodiments, the well fluid is within the group consisting of water, oil, and hydrocarbon gas.

In some exemplary embodiments, the polished rod deviates from a vertical orientation, and further wherein the packing assembly center portion flexible portion is sized and configured to accommodate deviations up to and including 3.5 degrees from the vertical orientation in all directions, such that the floating portion at least one packing seal element remains substantially sealed against the polished rod.

In some exemplary embodiments, the polished rod deviates from a vertical orientation, and further wherein the packing assembly center portion flexible portion is sized and configured to accommodate such angular deviations such that the floating portion at least one packing seal element remains substantially sealed against the polished rod.

In some exemplary embodiments, the packing assembly center portion flexible portion is sized and configured to accommodate angular deviations up to and including 3.5 degrees from the vertical orientation in all directions, such that the floating portion at least one packing seal element remains substantially sealed against the polished rod.

In some exemplary embodiments, the polished rod deviates laterally during operation, and further wherein the packing assembly center portion flexible portion is sized and configured to accommodate lateral translations of the polished rod, such that the floating portion at least one packing seal element remains substantially sealed against the polished rod.

In some exemplary embodiments, the packing assembly center portion flexible portion is sized and configured to accommodate lateral translations of the polished rod up to and including 3/8 inch in all directions, such that the floating portion at least one packing seal element remains substantially sealed against the polished rod.

In some exemplary embodiments of my invention, I have provided, for a well producing well fluids, and in combination with a reciprocating plunger type pump having a polished rod, and a stuffing box through which the polished rod moves, the stuffing box having a stuffing box packing seal, a secondary packing arrangement, through which the polished rod moves, the secondary packing arrangement, comprising: a housing having a chamber; packing assembly means, positioned within the housing chamber, through which the polished rod moves, the packing assembly means having: a packing assembly top portion having at least one packing seal element for sealing against the polished rod, the top portion being sealed against the housing; a packing assembly center portion, the center portion having: a floating portion, a fixed portion and a flexible portion, the floating portion having at least one packing seal element for sealing against the polished rod, the flexible portion attaching the floating portion to the fixed portion, the fixed portion being sealed against the housing, the floating, flexible and fixed portions cooperating to divide the housing chamber into an upper chamber and a lower chamber, the well fluids being received in the housing lower chamber, the well fluids pressurably engaging the packing assembly center portion, the flexible portion responding to variations in polished rod orientation such that the floating portion at least one packing seal element remains substantially sealed against the polished rod; and a bottom portion, the bottom portion retaining the floating portion within the housing, the housing upper chamber containing a barrier fluid, the barrier fluid pressurably engaging the packing assembly center portion; and a pressure transmitter having a cylinder and a piston within the cylinder, the cylinder having a well fluid communication end, the well fluid communication end fluidically communicating with the housing lower chamber such that well fluid pressures the piston, the cylinder having a barrier fluid communication end, the barrier fluid communication end fluidically communicating with the housing upper chamber, such that the barrier fluid pressurably engages the piston; the piston being sized such that the pressure from the well fluid on the piston is transmitted to the barrier fluid, the barrier fluid being pressured in the housing upper chamber to oppose the well fluid pressure on the packing assembly center portion.

In some exemplary embodiments, I have provided, for a well producing well fluids, and in combination with a reciprocating plunger type pump having a polished rod, a packing unit, through which the polished rod moves, the packing unit comprising: a housing having a chamber and a downward facing shoulder; a packing assembly, positioned within the housing chamber, through which the polished rod moves, the packing assembly having: a packing assembly center portion, the center portion being sealed against the housing to divide the housing chamber into an upper chamber and a lower chamber, the well fluids being received in the housing lower chamber, the well fluids pressurably engaging the packing assembly center portion; a bottom portion, the bottom portion supporting the center portion within the housing, the housing upper chamber containing a barrier fluid, the barrier fluid pressurably engaging the packing assembly center portion; and a top portion, the top portion comprising: a load ring, through which the polished rod travels; a seal positioner, through which the polished rod travels, the seal positioner supporting the load ring, the load ring being laterally movable with respect to the seal positioner, the seal positioner positioning at least one packing seal element about the polished rod, the seal positioner having a bottom, the seal positioner bottom being pressurably engaged by the barrier fluid, the pressured engagement displacing the seal positioner such that the load ring is moved against the housing downward facing shoulder, the load ring bearing upon the shoulder to divide the housing upper chamber into an upper chamber first sub-chamber and an upper chamber second sub-chamber, the seal positioner being positioned in the upper chamber first sub-chamber, the second sub-chamber being separated from barrier fluid pressure; and at least one packing seal in the housing upper chamber second sub-chamber; the packing unit further comprising a pressure transmitter having a cylinder and a piston within the cylinder, the cylinder having a well fluid communication end, the well fluid communication end fluidically communicating with the housing lower chamber such that well fluid pressures the piston, the cylinder having a barrier fluid communication end, the barrier fluid communication end fluidically communicating with the housing upper chamber, such that the barrier fluid pressurably engages the piston; the piston being sized such that the pressure from the well fluid on the piston is transmitted to the barrier fluid, the barrier fluid being pressured in the housing upper chamber to oppose the well fluid pressure on the packing assembly center portion and to pressurably displace the seal positioner.

In some exemplary embodiments, the packing unit further comprising a top member, through which the polished rod moves, the top member being attachable to the housing, the packing unit further comprising a wiper positioning member, supported and retained by the top member, for positioning a wiper adjacent the polished rod.

In some exemplary embodiments, the housing has an upward facing shoulder and further wherein the top member further comprises a bottom end and downward facing shoulder, the top member bottom end being insertable within the housing upper chamber second sub-chamber such that the top member downward facing shoulder abuts the housing upward facing shoulder and further insertion of the top member is prevented, and further such that the top member bottom end is spaced from the at least one packing seal in the second sub-chamber.

In some exemplary embodiments, the housing comprises a top structure and a bottom structure, the top structure having a bottom surface and a plurality of standoff members, the standoff members preventing the packing assembly center unit from sealing against the top structure bottom surface.

In some exemplary embodiments, the seal positioner further comprises an upper portion, the upper portion extending radially to form a downward facing shoulder, and the packing unit further comprises a seal element positioned between the seal positioner and the housing, the seal element being pressured by barrier fluids to bear against the seal positioner downward facing shoulder, the seal element providing sealing between, and preventing barrier fluid passage from, the housing upper chamber first sub-chamber into the second sub-chamber.

In some exemplary embodiments, the housing downward facing shoulder is beveled such that the shoulder has an increasing interior diameter as the shoulder extends downwardly.

In some exemplary embodiments, the barrier fluid pressure and the well fluid pressure are substantially balanced across the packing assembly center portion.

In some exemplary embodiments, the barrier fluid pressure is not less than the well fluid pressure, across the packing assembly center portion.

In some exemplary embodiments, the well has a flow line transporting produced well fluids, and the well fluid is routed from the well flow line to the pressure transmitter cylinder well fluid communication end.

In some exemplary embodiments, the well has a casing, the well accumulating pressured gas in the casing, and the well fluid is routed from the casing to the pressure transmitter cylinder well fluid communication end.

In some exemplary embodiments, the barrier fluid is selected from the group consisting of hydrocarbon based, vegetable based, and animal fat based fluids.

In some exemplary embodiments, the well fluid is within the group consisting of water, oil, and hydrocarbon gas.

In some exemplary embodiments, the polished rod deviates from a vertical orientation, and the seal positioner and load ring are sized and configured to accommodate such angular deviations such that the seal positioner floating portion at least one packing seal element remains substantially sealed against the polished rod.

In some exemplary embodiments, the seal positioner and load ring are sized and configured to accommodate angular deviations of approximately two degrees from the vertical orientation in all directions, such that the seal positioner at least one packing seal element remains substantially sealed against the polished rod.

In some exemplary embodiments, the polished rod deviates laterally during operation, and the seal positioner and load ring are sized and configured to accommodate lateral translations of the polished rod, such that the seal positioner at least one packing seal element remains substantially sealed against the polished rod.

I have provided, in some exemplary embodiments, for a well producing well fluids, and in combination with a reciprocating plunger type pump having a polished rod, a packing unit, through which the polished rod moves, the packing unit comprising: a housing having a chamber and a downward facing shoulder; packing assembly means for sealing the polished rod and preventing well fluids from leaking outside the housing from around the polished rod, the packing assembly means being positioned within the housing chamber, through which the polished rod moves, the packing assembly means comprising: a packing assembly center portion, the center portion being sealed against the housing to divide the housing chamber into an upper chamber and a lower chamber, the well fluids being received in the housing lower chamber, the well fluids pressurably engaging the packing assembly center portion; a packing assembly bottom portion, the bottom portion supporting the center portion within the housing, the housing upper chamber containing a barrier fluid, the barrier fluid pressurably engaging the packing assembly center portion; and a packing assembly top portion, the top portion comprising: a load ring, through which the polished rod travels; a seal positioner, through which the polished rod travels, the seal positioner supporting the load ring, the load ring being laterally movable with respect to the seal positioner, the seal positioner positioning at least one packing seal about the polished rod, the seal positioner having a bottom, the seal positioner bottom being pressurably engaged by the barrier fluid, the pressured engagement displacing the seal positioner such that the seal positioner moves the load ring against the housing downward facing shoulder, the load ring bearing upon the shoulder to divide the housing upper chamber into an upper chamber first sub-chamber and an upper chamber second sub-chamber, the seal positioner being positioned in the upper chamber first sub-chamber, the second sub-chamber being separated from barrier fluid pressure; and at least one packing seal in the housing upper chamber second sub-chamber; the packing unit further comprising a pressure transmitter having a cylinder and a piston within the cylinder, the cylinder having a well fluid communication end, the well fluid communication end fluidically communicating with the housing lower chamber such that well fluid pressures the piston, the cylinder having a barrier fluid communication end, the barrier fluid communication end fluidically communicating with the housing upper chamber, such that the barrier fluid pressurably engages the piston; the piston being sized such that the pressure from the well fluid on the piston is transmitted to the barrier fluid, the barrier fluid being pressured in the housing upper chamber to oppose the well fluid pressure on the packing assembly center portion and to pressurably displace the seal positioner.

In some exemplary embodiments, I have provided, for a well producing well fluids, and in combination with a reciprocating plunger type pump having a polished rod, a packing unit, through which the polished rod moves, the packing unit, comprising: a housing having a chamber and a downward facing shoulder; a packing assembly, positioned within the housing chamber, through which the polished rod moves, the packing assembly having: a packing assembly center portion, the center portion having: a floating portion, a fixed portion and a flexible portion, the floating portion having at least one packing seal element for sealing against the polished rod, the flexible portion attaching the floating portion to the fixed portion, the fixed portion being sealed against the housing, the floating, flexible and fixed portions cooperating to divide the housing chamber into an upper chamber and a lower chamber, the well fluids being received in the housing lower chamber, the well fluids pressurably engaging the packing assembly center portion, the flexible portion responding to variations in polished rod orientation such that the floating portion at least one packing seal element remains substantially sealed against the polished rod; a bottom portion, the bottom portion retaining the floating portion within the housing, the housing upper chamber containing a barrier fluid, the barrier fluid pressurably engaging the packing assembly center portion; and a top portion, the top portion comprising: a load ring, through which the polished rod travels; a seal positioner, through which the polished rod travels, the seal positioner supporting the load ring, the load ring being laterally movable with respect to the seal positioner, the seal positioner positioning at least one packing seal about the polished rod, the seal positioner having a bottom, the seal positioner bottom being pressurably engaged by the barrier fluid, the pressured engagement displacing the seal positioner such that the seal positioner moves the load ring against the housing downward facing shoulder, the load ring bearing upon the shoulder to divide the housing upper chamber into an upper chamber first sub-chamber and an upper chamber second sub-chamber, the seal positioner being positioned in the upper chamber first sub-chamber, the second sub-chamber being separated from barrier fluid pressure; and at least one packing seal in the housing upper chamber second sub-chamber; the packing unit further comprising a pressure transmitter having a cylinder and a piston within the cylinder, the cylinder having a well fluid communication end, the well fluid communication end fluidically communicating with the housing lower chamber such that well fluid pressures the piston, the cylinder having a barrier fluid communication end, the barrier fluid communication end fluidically communicating with the housing upper chamber, such that the barrier fluid pressurably engages the piston; the piston being sized such that the pressure from the well fluid on the piston is transmitted to the barrier fluid, the barrier fluid being pressured in the housing upper chamber to oppose the well fluid pressure on the packing assembly center portion and to pressurably displace the seal positioner.

The foregoing features and advantages of my invention will be apparent from the following more particular descriptions of exemplary embodiments of the invention as illustrated, in some embodiments, in the accompanying drawings.

BRIEF DESCRIPTION OF THE DRAWINGS

FIG. 13 is a bottom view of a packing assembly cap first member in an exemplary embodiment of the prior art.

FIG. 14 is a sectional view of the packing assembly cap first member in FIG. 13.

FIG. 36 is a top view of a packing cylinder support bottom portion of an exemplary embodiment of the present invention.

FIG. 37 is a sectional view of the cylinder support bottom portion of FIG. 36, cut along section line 37-37 in FIG. 36.

DETAILED DESCRIPTION OF EXEMPLARY EMBODIMENTS

The following discussion describes exemplary embodiments of the invention in detail. This discussion should not be construed, however, as limiting the invention to those particular embodiments. Practitioners skilled in the art will recognize numerous other embodiments as well. For a definition of the complete scope of the invention, the reader is directed to the appended claims.

Prior art exemplary embodiments are described below with reference to FIGS. 1-21, as discussed in U.S. Pat. No. 7,343,969, to Palmour and the inventor herein, said patent being incorporated herein by reference for all purposes. Exemplary embodiments of the present invention are described below with reference to FIGS. 22-37, and will be shown to enhance the performance of such prior art.

Figure 1:
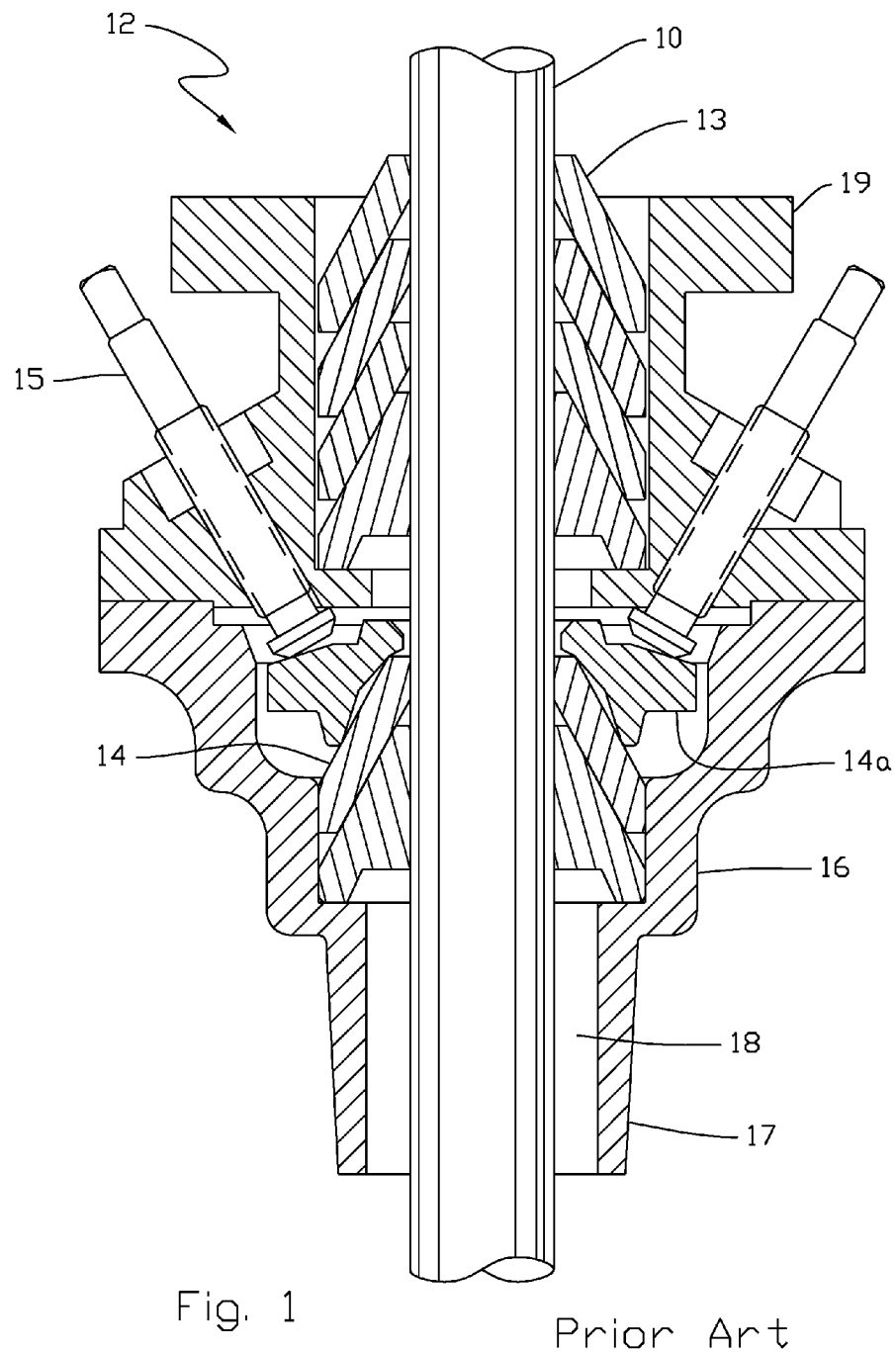
FIG. 1 is a sectional view of a conventional double pack stuffing box.

Referring now to FIG. 1, a typical polished rod 10 extends from the well head and through a conventional double pack stuffing box 12. This stuffing box has two packing seal 13,14 with each seal having at least two packing seal elements. The packing seal is commercially available and typically referred to as cone or dome packing. Tightening the bolts 15 presses the packing seal 14 against the polished rod by being turned against a packing seal compression ring 14a. The stuffing box has a lower housing 16 with a threaded end 17 for connecting to the well head, such that well fluids will enter the annulus 18 about the polished rod, from the well head fluid outlet below. The stuffing box also has an upper housing 19, encompassing the packing seal 13. A typical well will have a flow line leading from the well head for transporting well fluids, the well fluids typically including oil, salt water, and/or hydrocarbon gas. Such a flow line is in fluid communication with the well head fluid outlet to which the stuffing box is attached. Furthermore, a typical well will have a casing, in which well fluids, in the form of hydrocarbon gas, are accumulated under pressure.

Figure 2:
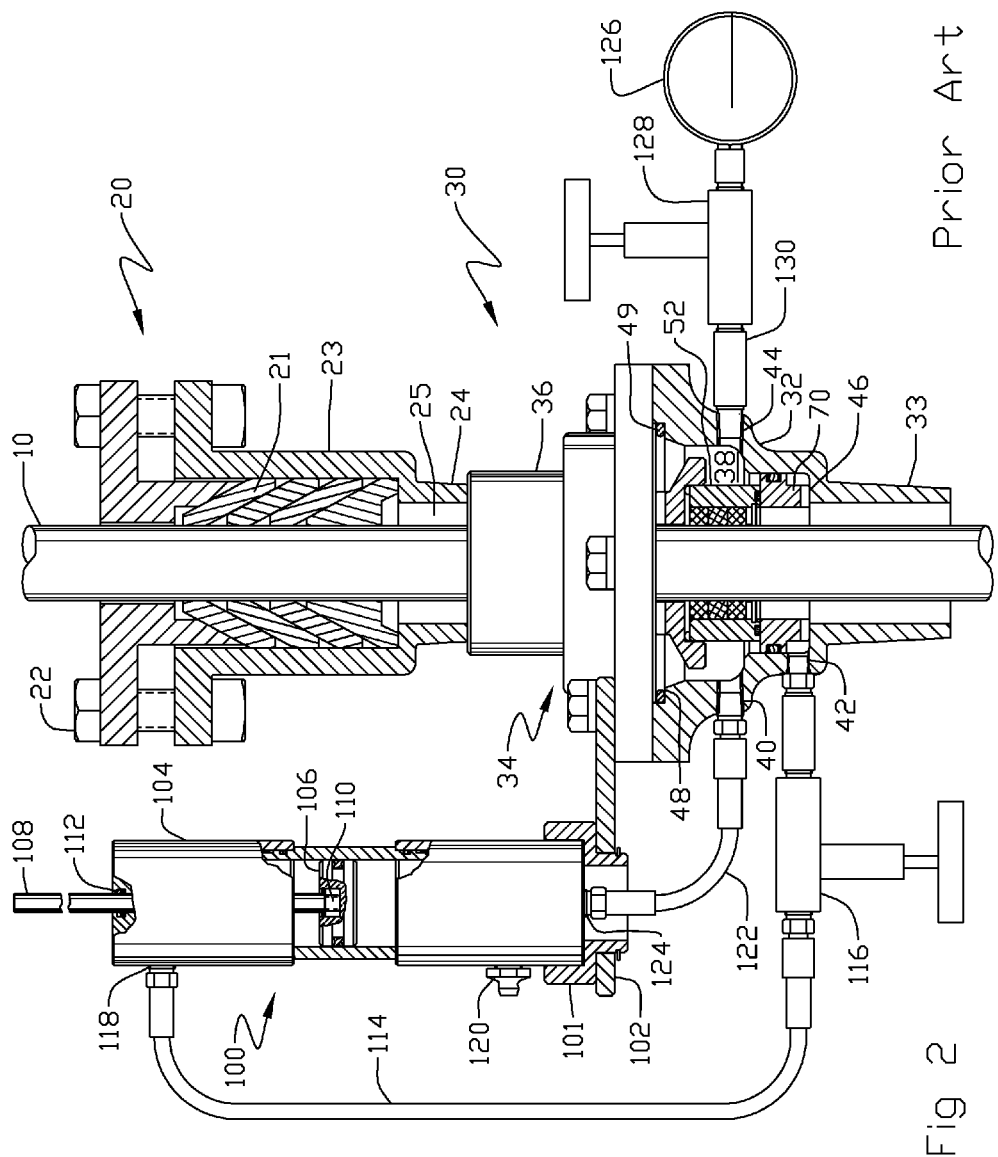
FIG. 2 is a partially sectional view of an exemplary embodiment of the prior art.
Figure 3:
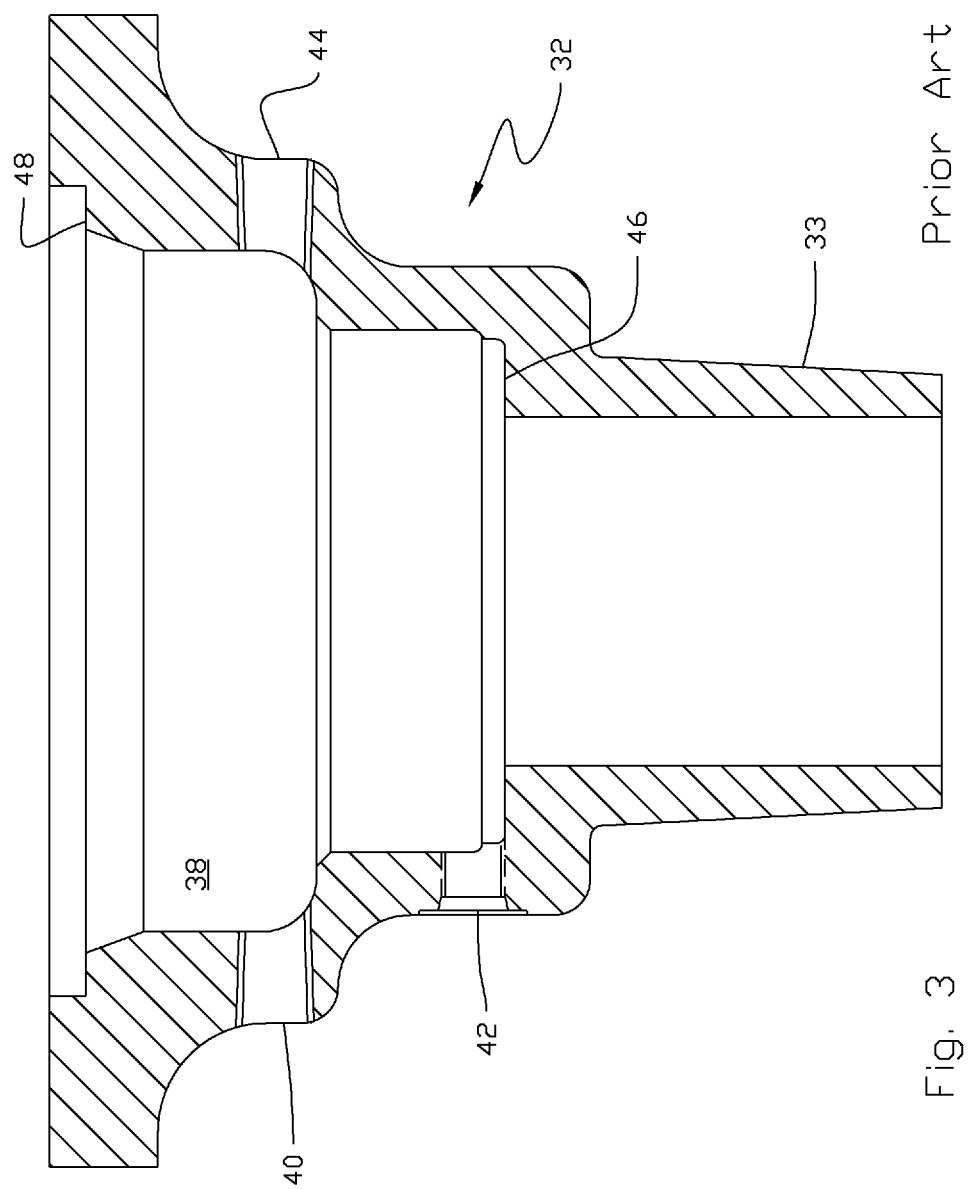
FIG. 3 is a sectional view of the lower housing in an exemplary embodiment of the prior art.

Referring now to FIG. 2, an exemplary embodiment of the secondary packing arrangement device 30 of the prior art is illustrated in combination with a conventional single pack stuffing box 20 having a packing seal 21 with four packing seal elements. In the conventional single pack stuffing box, when bolts 22 are tightened the packing seal is pressed against the polished rod 10. The stuffing box has a lower housing 23 with a threaded end 24 that, in a conventional installation, attaches to the well head such that an annulus 25 is formed about the polished rod.

In the exemplary embodiment of the prior art shown in FIG. 2 and in a closer view in FIG. 14, the secondary packing arrangement 30 has a housing including a lower housing 32 that can readily be adapted from the lower housing 16 of the conventional double pack stuffing box shown in FIG. 1, with only slight resizing of the interior. The lower housing is shown in more detail in FIG. 3. The lower housing has a lower end 33 that threadably attaches to the wellhead at a well fluid outlet such that well fluids enter the lower housing. Bolted to the lower housing 32 is a top member 34 with an adapter 36 for threadably receiving the conventional single pack stuffing box lower housing end 24. The secondary packing arrangement housing forms a chamber 38 that is in fluid communication with the stuffing box packing seal 21. The lower housing 32 has three threaded outlets 40,42,44, a first shoulder 46 and a second shoulder 48. The bolted joinder of the housing top member 34 to the lower housing 32 is sealed by a conventional O-ring 49 adjacent the second shoulder 48.

Figure 4:
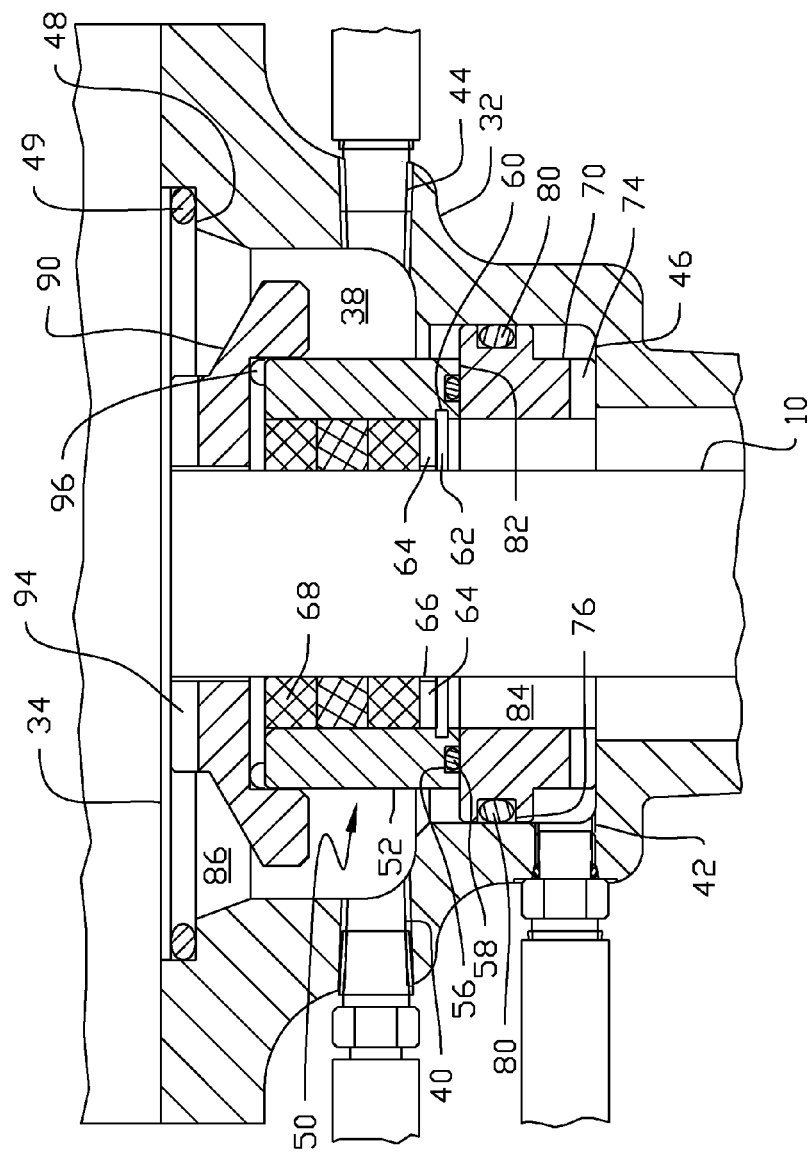
FIG. 4 is an enlargement of a portion of FIG. 2.
Figure 6:
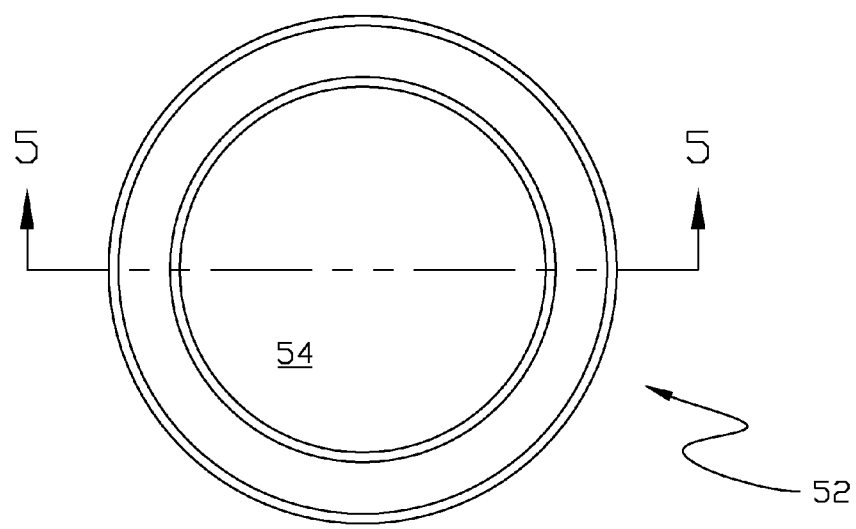
FIG. 6 is a top view of the packing assembly upper portion in FIG. 5.
Figure 5:
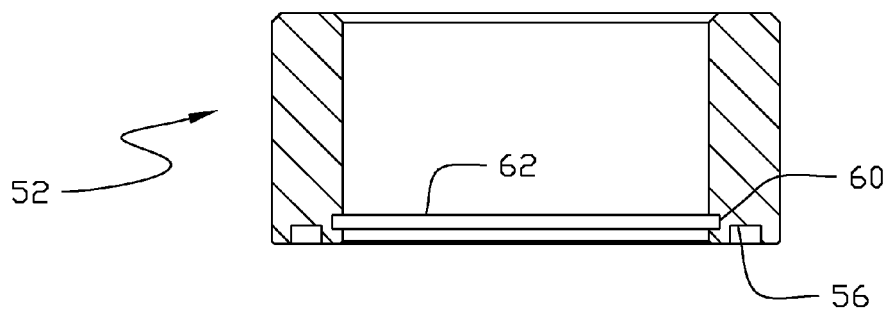
FIG. 5 is a sectional view of the packing assembly upper portion in an exemplary embodiment of the prior art.

As further illustrated in FIG. 2 and FIG. 4, this exemplary embodiment of the secondary packing arrangement 30 of the prior art includes a packing assembly 50, positioned within the housing chamber 38, through which the polished rod 10 moves. In this exemplary embodiment, the packing assembly includes a cylinder having a top portion 52, shown in more detail in FIG. 5 and FIG. 6. As shown therein, the top portion is shown to have an open bottom 54, a groove 56 for accepting an O-ring 58, and a groove 60 for accepting a conventional snap ring 62. The snap ring supports a conventional washer 64, the washer sized to create a clearance 66 between the washer and the polished rod 10. The snap ring and washer retain a packing seal, which includes three conventional packing seal elements 68 positioned within the cylinder upper portion. These packing seal elements seal against the polished rod, preventing well fluid passage through the packing assembly cylinder upper portion.

Figure 7:
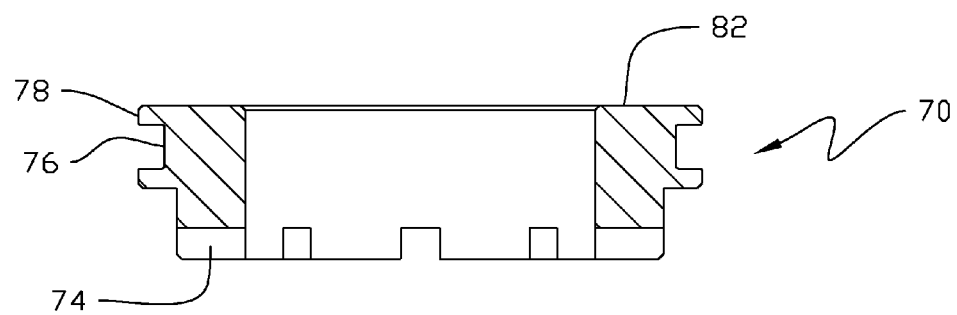
FIG. 7 is a sectional view of the packing assembly lower portion in an exemplary embodiment of the prior art.
Figure 8:
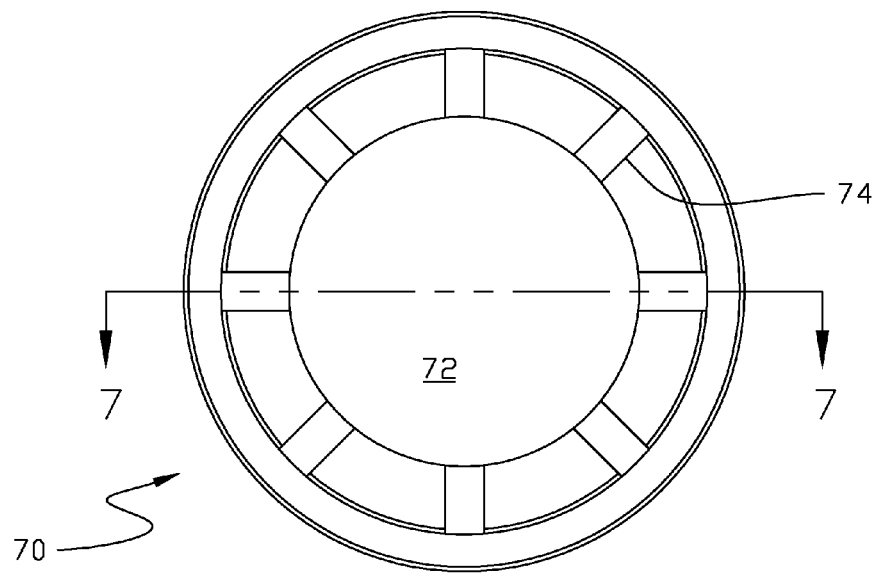
FIG. 8 is a bottom view of the packing assembly lower portion in FIG. 7.

In the exemplary embodiment of the prior art illustrated in FIG. 4, the packing assembly cylinder also includes a bottom portion 70, shown in more detail in FIG. 7 and FIG. 8. The cylinder bottom portion has an opening 72, eight fluid passages 74, and a groove 76 in its outer wall 78 for positioning an O-ring 80 against the lower housing interior, thus sealing the annulus around the cylinder bottom portion 70 to prevent well fluids from passing to the annulus about the cylinder upper portion 52. The cylinder bottom portion also includes an upper surface 82 against which the cylinder upper portion 52 seals using the O-ring 58. These two seals, along with the seal between the polished rod and the packing seal elements 68, effectively divide the housing chamber 38 into a first chamber 84 and a second chamber 86, well fluids being present in the first chamber only.

Figure 10:
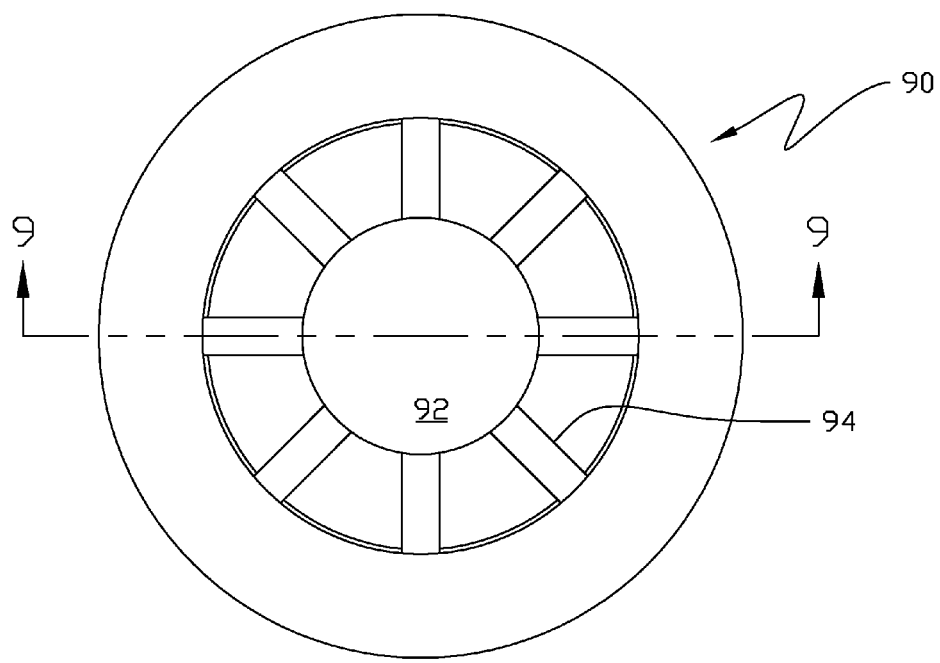
FIG. 10 is a top view of the packing assembly cap in FIG. 9.
Figure 9:
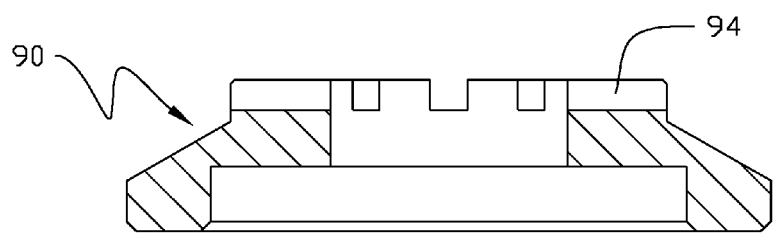
FIG. 9 is a sectional view of the packing assembly cap in an exemplary embodiment of the prior art.

In this exemplary embodiment of the prior art of FIG. 2 and FIG. 4, the packing assembly 50 also includes a cap 90, shown in more detail in FIG. 9 and FIG. 10. The cap has an opening 92 and eight fluid passages 94. The cap fits on the top of the cylinder upper portion 52, and a conventional wave spring 96 is positioned between the cap and the cylinder upper portion. During installation of the secondary packing arrangement 30, the cap and the cylinder upper portion are free to simultaneously move along the top surface of the cylinder bottom portion 70 without breaking the seal between the cylinder upper and bottom portions. This allows optimum positioning of the packing seal elements 68 with respect to the polished rod 10. The housing top portion bears upon the cap as it is tightened, compressing wave spring 96, thereby loading O-ring 58 and maintaining a seal between cylinder upper and bottom portions.

In the exemplary embodiment of the prior art depicted in FIG. 2 and FIG. 4, the second chamber 86 is filled with a barrier fluid, which moves in the second chamber and through the cap 90 fluid passages 94 such that the barrier fluid contacts the packing seal, and any pressure within the second chamber acts on the packing seal elements.

A pressure transmitter 100 is provided in the exemplary embodiment of the prior art shown in FIG. 2. The transmitter sits in a base 101 that is attached to the housing top portion 34 using a bracket 102. The transmitter includes a cylinder 104 and a piston 106 within the cylinder. Attached to the piston is a rod 108 that screws into a nut 110 mounted in the piston. The rod extends from the cylinder through hole 112 with an elastomer seal. A hose 114 with a valve 116 extends from one of the lower housing outlets in the housing first chamber 84, and enters a well fluid communication end of the cylinder through inlet 118, establishing communication of well fluids and well fluids pressure from the well fluid outlet, through the housing first chamber, into the cylinder, and to the top of the piston. During installation the grease fitting 120 allows the operator to fill the housing second chamber 86 and the barrier fluid communication end of the cylinder below the piston with barrier fluid. A hose 122 extends from a cylinder barrier fluid communication end outlet 124 to one of the lower housing outlets 40, thus establishing barrier fluid communication between the housing second chamber and the cylinder below the piston.

In the exemplary embodiment of the prior art illustrated in FIG. 2, the pressure transmitter piston 110 is sized such that the pressure from the well fluid on the piston is transmitted to the barrier fluid, resulting in the desired regulation of pressure across the packing assembly packing seal.

The rod 108 extruding from the cylinder 104 in the exemplary embodiment illustrated in FIG. 2 provides an indication as to the amount of barrier fluid. The greater the extended length, the more barrier fluid is present. In some exemplary embodiments, appropriate indicia are provided on the rod to provide information to the operator as to required addition of barrier fluid. In some exemplary embodiments of the prior art, the rod is of sufficient size that it can be viewed by the operator from a distance.

In some exemplary embodiments of the prior art, and as shown in FIG. 2, a pressure gauge 126, with valve 128 and related attachment fittings 130, is attached to the housing through one of the lower housing outlets 44, allowing the operator to determine the pressure in the housing second chamber 86, the pressure being then comparable by the operator to conventional well head pressure gauges (reflecting pressure in the housing first chamber 84) to confirm the proper regulation of pressure across the packing seal 50.

Figure 11:
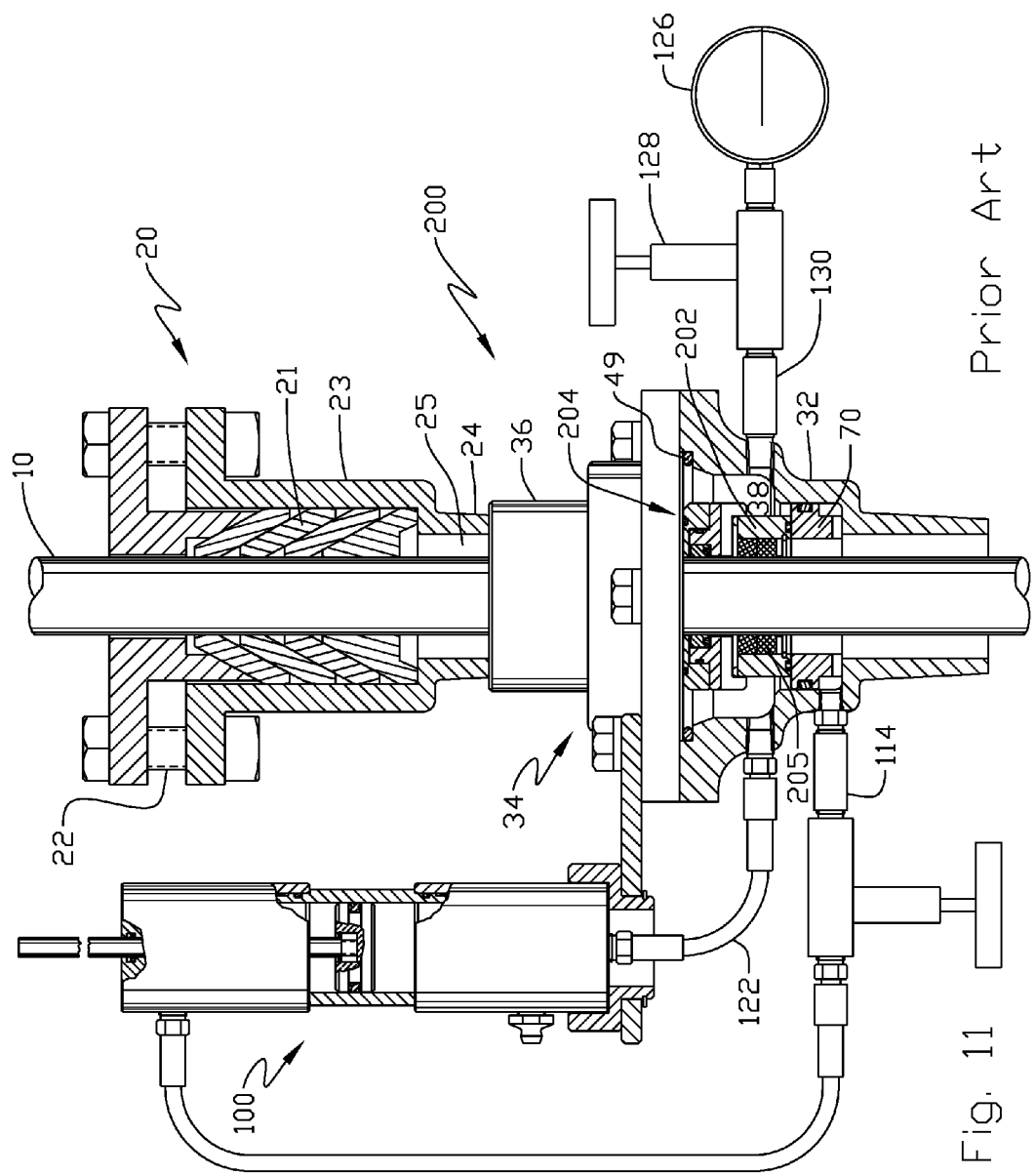
FIG. 11 is a partially sectional view of an exemplary embodiment of the prior art.
Figure 12:
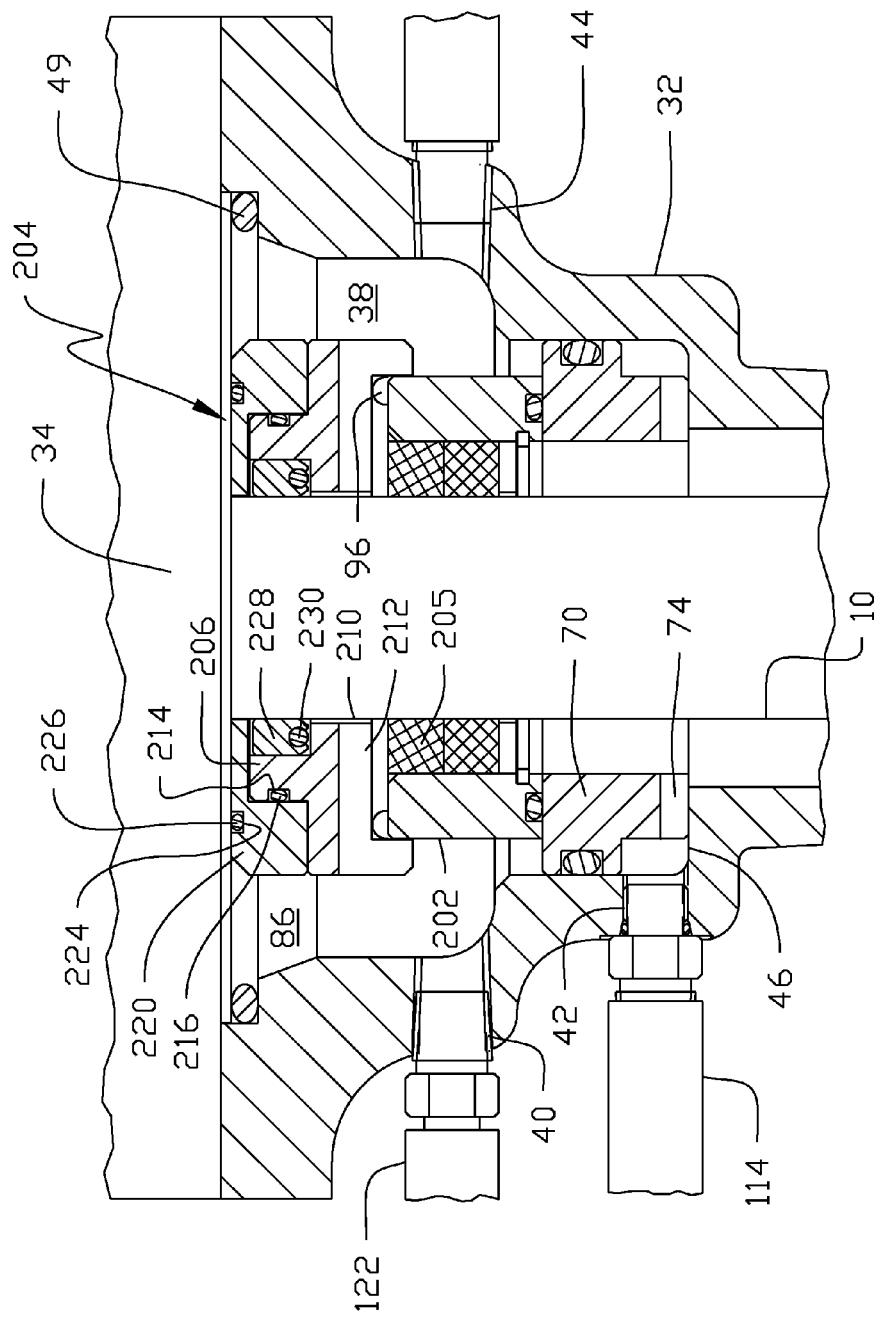
FIG. 12 is an enlargement of a portion of FIG. 11.
Figure 16:
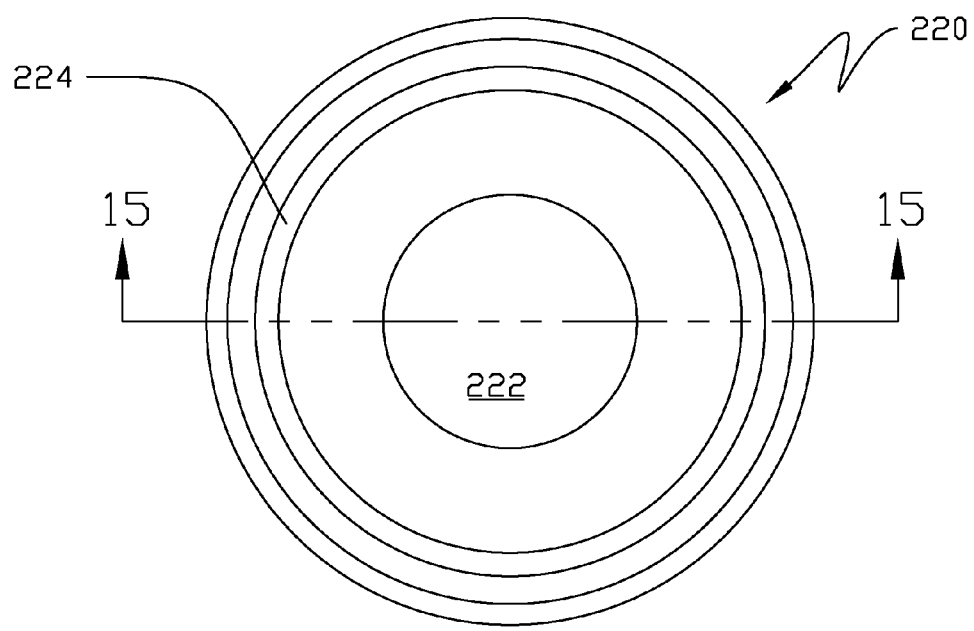
FIG. 16 is a top view of the packing assembly cap second member in FIG. 15.
Figure 15:
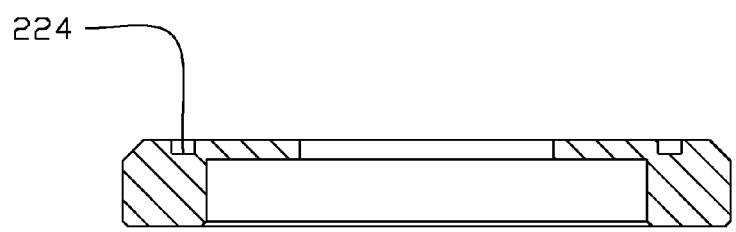
FIG. 15 is a sectional view of a packing assembly cap second member in an exemplary embodiment of the prior art.

In another exemplary embodiment of the prior art, depicted in FIG. 11 and in more detail in FIG. 12, a different packing assembly cylinder upper portion 202 and cap 204 are provided. The cylinder upper portion 202 is reduced in height and encloses two packing seal elements 205. The snap ring 62 and the washer 64 are unchanged and support the packing seal elements as in the previously described exemplary embodiment. The cylinder upper portion 202 is free for sealed lateral movement and positioning during installation. Similarly, the packing assembly lower portion 70 seals against the housing to divide the housing into the first chamber 84 and the second chamber 86.

In the exemplary embodiment of the prior art shown in FIG. 12, the cap 204 includes a first member 206, shown in more detail in FIG. 13 and FIG. 14. The first member includes an opening 208 sized to create the clearance 210 between the first member opening and the polished rod 10. The first member has eight fluid passages 212 and a groove 214 for positioning an O-ring 216. The packing assembly cap second member 220, shown in more detail in FIG. 15 and FIG. 16, includes an opening 222 for the polished rod and a groove 224 for positioning an O-ring 226.

In this exemplary embodiment 200 of the prior art, the O-ring 216 seals the packing assembly cap first member 206 against the second member 220, and the O-ring 226 seals the second member against the housing top portion 34. The first and second members mate to form a space for positioning an intermediate packing seal member 228 about the polished rod, the intermediate packing seal member integrating an O-ring 230 for energizing the seal member against the polished rod 10. Unlike the cap 90 of the previous embodiment, the cap 204 in this exemplary embodiment does not have a fluid passage for allowing barrier fluid to contact the packing seal 21 of the conventional stuffing box 20. Instead, the cap 204 cooperates with the opening in the housing top member 34 to form a third chamber 232 between the cap second member, the intermediate packing seal member and the packing seal 21 of the stuffing box. The intermediate packing seal prevents barrier fluid from the second chamber from entering the third chamber. The intermediate packing seal load is automatically set upon installation and is not adjustable.

Figure 17:
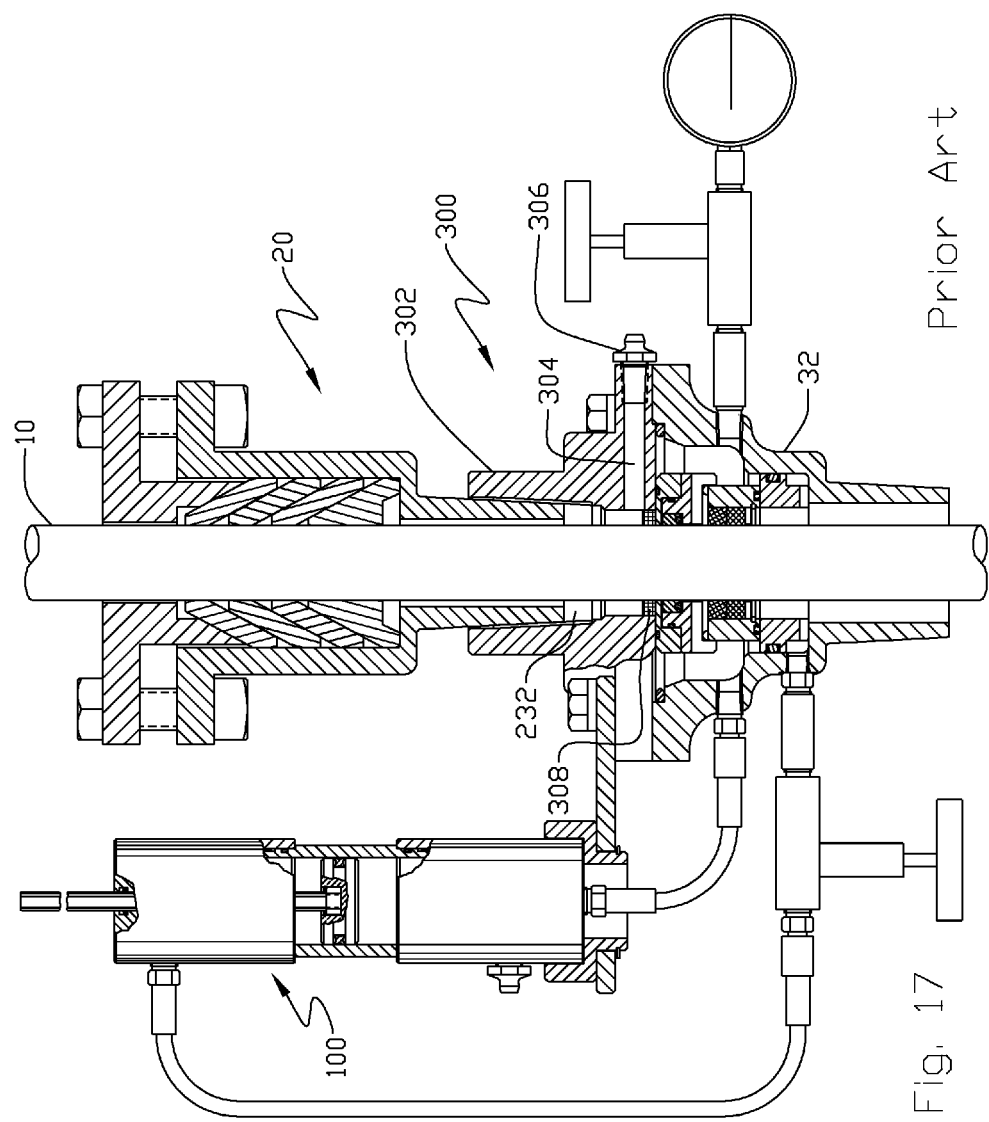
FIG. 17 is a partially sectional view of an exemplary embodiment of the prior art.
Figure 18:
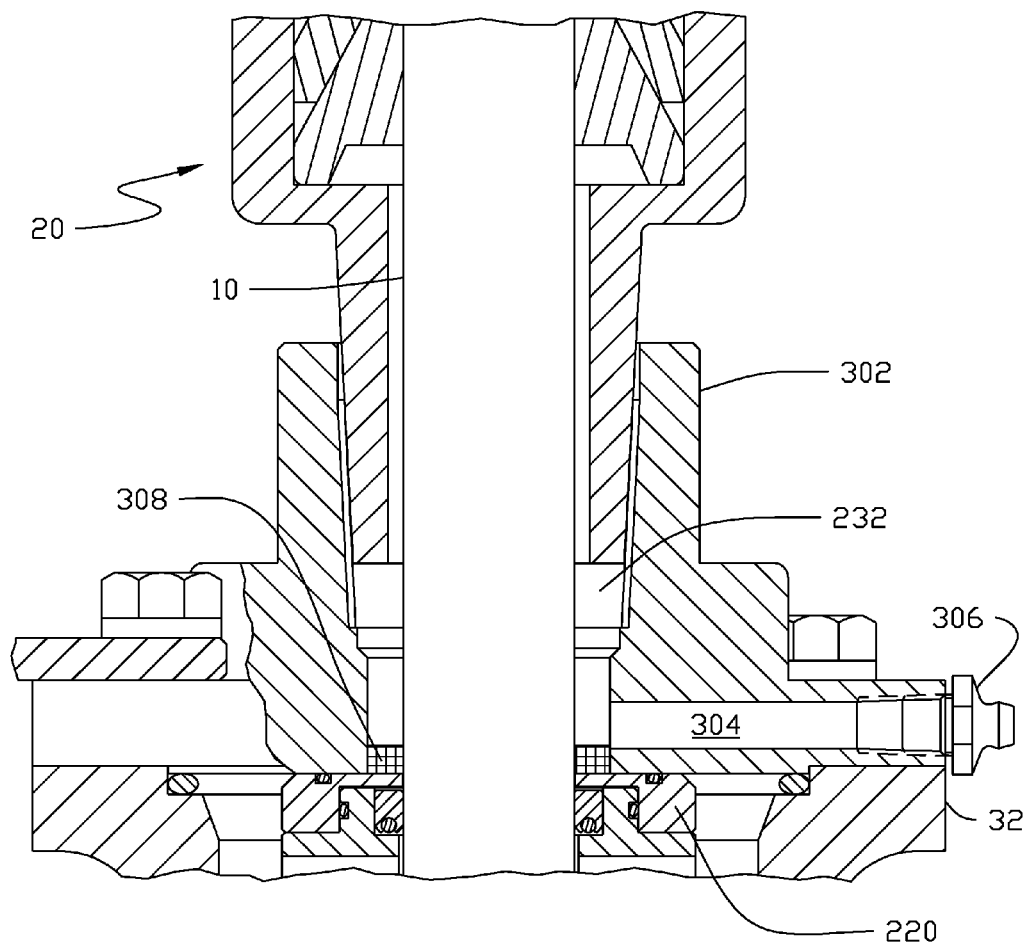
FIG. 18 is an enlargement of a portion of FIG. 17.

In another exemplary embodiment of the prior art, of the type depicted in FIG. 17 and shown in more detail in FIG. 18, the housing top portion 302 is modified to include an outlet 304 from the third chamber 232, the outlet being adapted to receive a grease fitting 306. During installation the operator fills the third chamber with a barrier fluid, such as grease, and also positions a wick-type material about the polished rod 10 in the third chamber for soaking in the fluid and lubricating the polished rod.

Refer again to the exemplary embodiment of the prior art depicted in FIG. 2 and FIG. 4, and the pressure transmitter 100, the hose 114, with valve 116, connected to inlet 118 on the well fluid communication end of the transmitter cylinder 104, the hose 122 connected to outlet 124 on the barrier fluid communication end of the transmitter cylinder 104, and the grease fitting 120. In another exemplary embodiment of the prior art 30a, of the type depicted in FIG. 19, a hose 114a connects to outlet 124a on what is now the well fluid communication end of the transmitter 100a cylinder 104a, a hose 122a connects to inlet 118a on what is now the barrier fluid communication end of the transmitter cylinder 104a, and the grease fitting 120a is positioned on the barrier fluid communication end of the transmitter cylinder 104a. This reversal of hoses to the transmitter results in the barrier fluid, such as grease, being present in the top (barrier fluid communication end) of the transmitter where the seal about the indicator rod 108a is located at the hole 112 (see FIG. 2) in the transmitter cylinder 104a. Should this seal leak, the leaked fluid will be the relatively clean barrier fluid, instead of well fluids.

Similarly, refer again to the exemplary embodiment of the prior art depicted in FIG. 11 and FIG. 12, having corresponding pressure transmitter components with the exemplary embodiment of the prior art of FIG. 2, i.e. the pressure transmitter 100, the hose 114, with valve 116, connected to inlet 118 on the well fluid communication end of the transmitter cylinder 104, the hose 122 connected to outlet 124 on the barrier fluid communication end of the transmitter cylinder 104, and the grease fitting 120. In another exemplary embodiment of the prior art 200a, of the type depicted in FIG. 20, a hose 114a connects to outlet 124a on what is now the well fluid communication end of the transmitter 100a cylinder 104a, a hose 122a connects to inlet 118a on what is now the barrier fluid end of the transmitter cylinder 104a, and the grease fitting 120a is positioned on the barrier fluid communication end of the transmitter cylinder 104a. This reversal of hoses to the transmitter results in the barrier fluid, such as grease, being present in the top (barrier fluid communication end) of the transmitter where the seal about the indicator rod 108a is located at the hole 112 (see FIG. 2) in the transmitter cylinder 104a. Again, should this seal leak, the leaked fluid will be the relatively clean barrier fluid, instead of well fluids.

Similarly, refer again to the exemplary embodiment of the prior art depicted in FIG. 17 and FIG. 18, having corresponding pressure transmitter components with the exemplary embodiment of the prior art of FIG. 2, i.e. the pressure transmitter 100, the hose 114, with valve 116, connected to inlet 118 on the well fluid communication end of the transmitter cylinder 104, the hose 122 connected to outlet 124 on the barrier fluid communication end of the transmitter cylinder 104, and the grease fitting 120. In another exemplary embodiment of the prior art 300a, of the type depicted in FIG. 21, a hose 114a connects to outlet 124a on what is now the well fluid communication end of the transmitter 100a cylinder 104a, a hose 122a connects to inlet 118a on what is now the barrier fluid communication end of the transmitter cylinder 104a, and the grease fitting 120a is positioned on the barrier fluid communication end of the transmitter cylinder 104a. This reversal of hoses to the transmitter results in the barrier fluid, such as grease, being present in the top (barrier fluid communication end) of the transmitter where the seal about the indicator rod 108a is located at the hole 112 (see FIG. 2) in the transmitter cylinder 104a. Again, should this seal leak, the leaked fluid will be the relatively clean barrier fluid, instead of well fluids.

Figure 19:
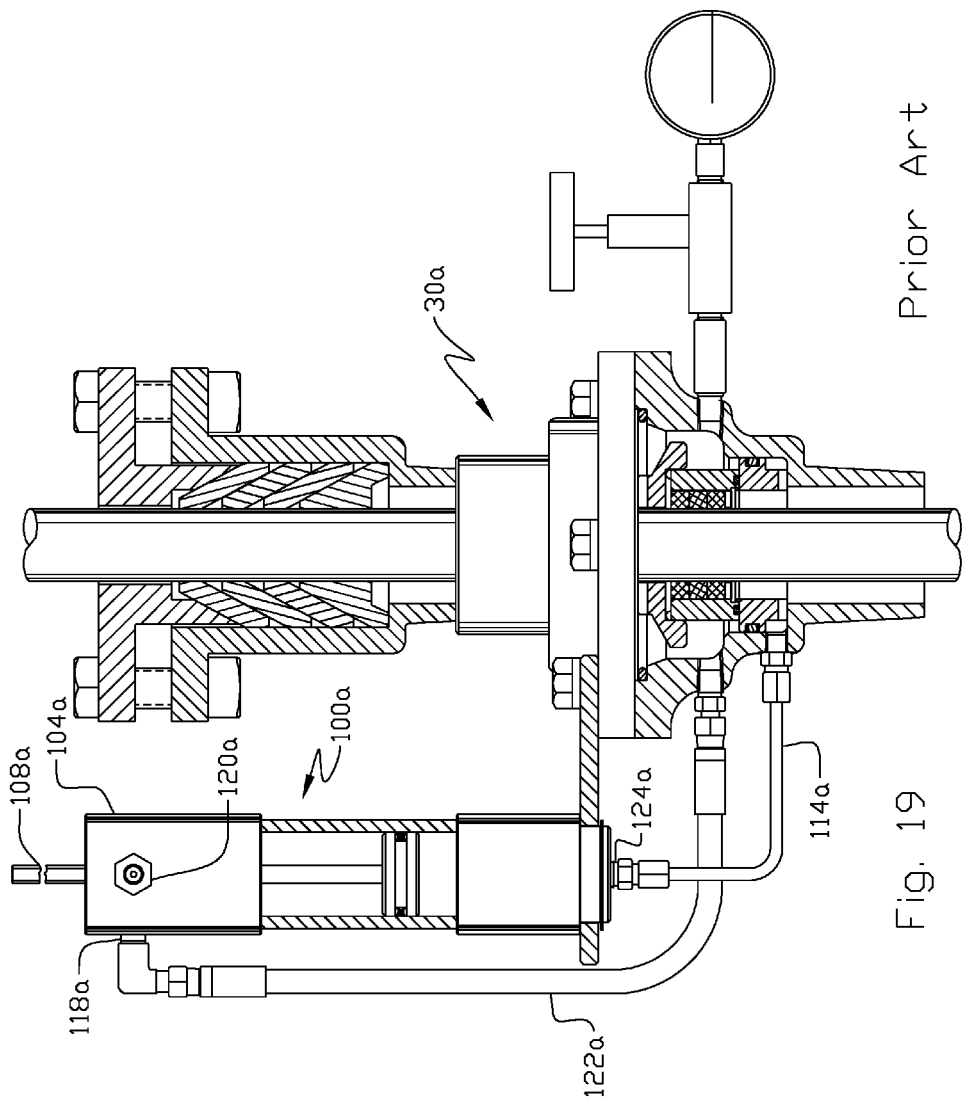
FIG. 19 is a partially sectional view of an exemplary embodiment of the prior art.
Figure 20:
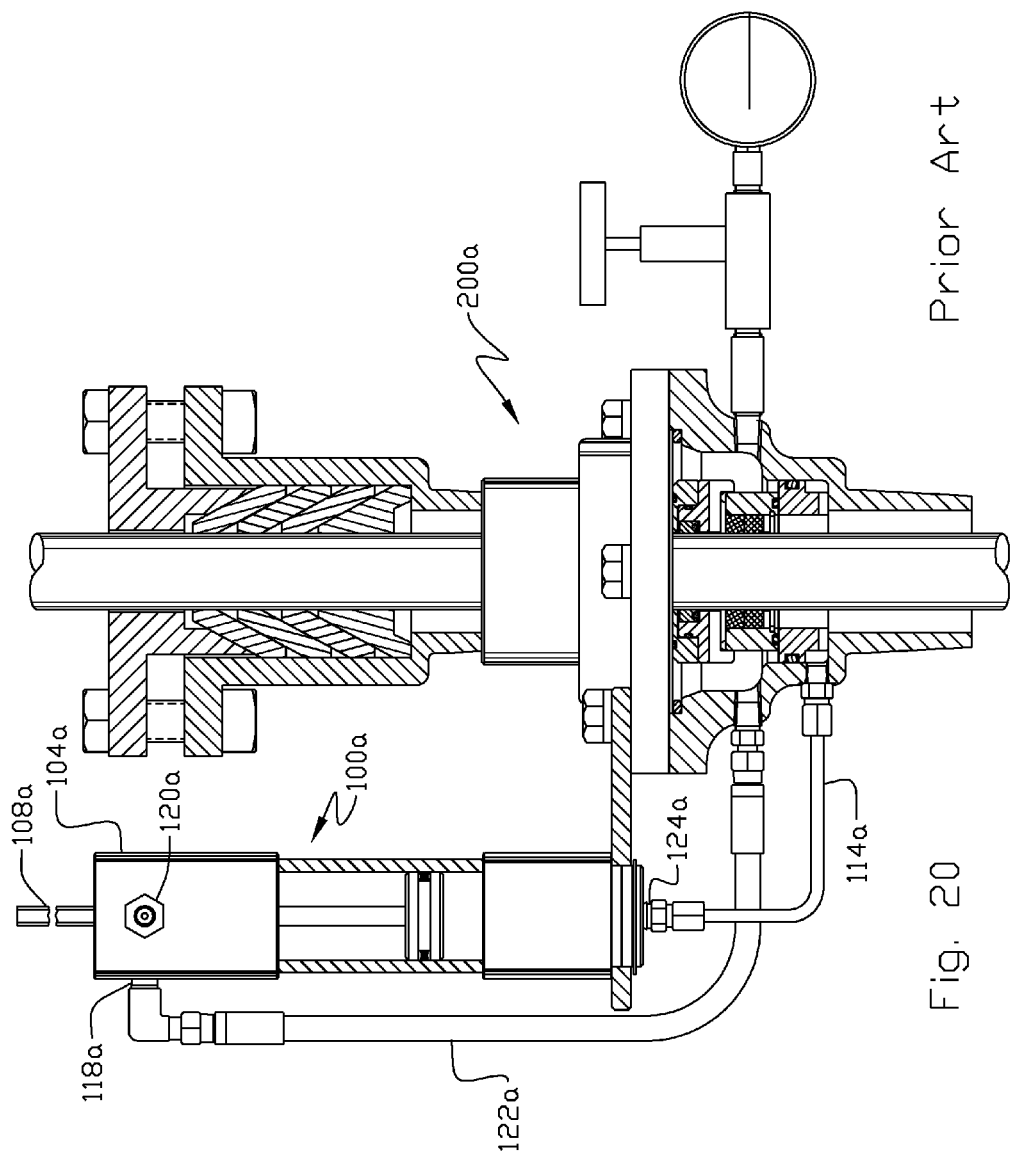
FIG. 20 is a partially sectional view of an exemplary embodiment of the prior art.
Figure 21:
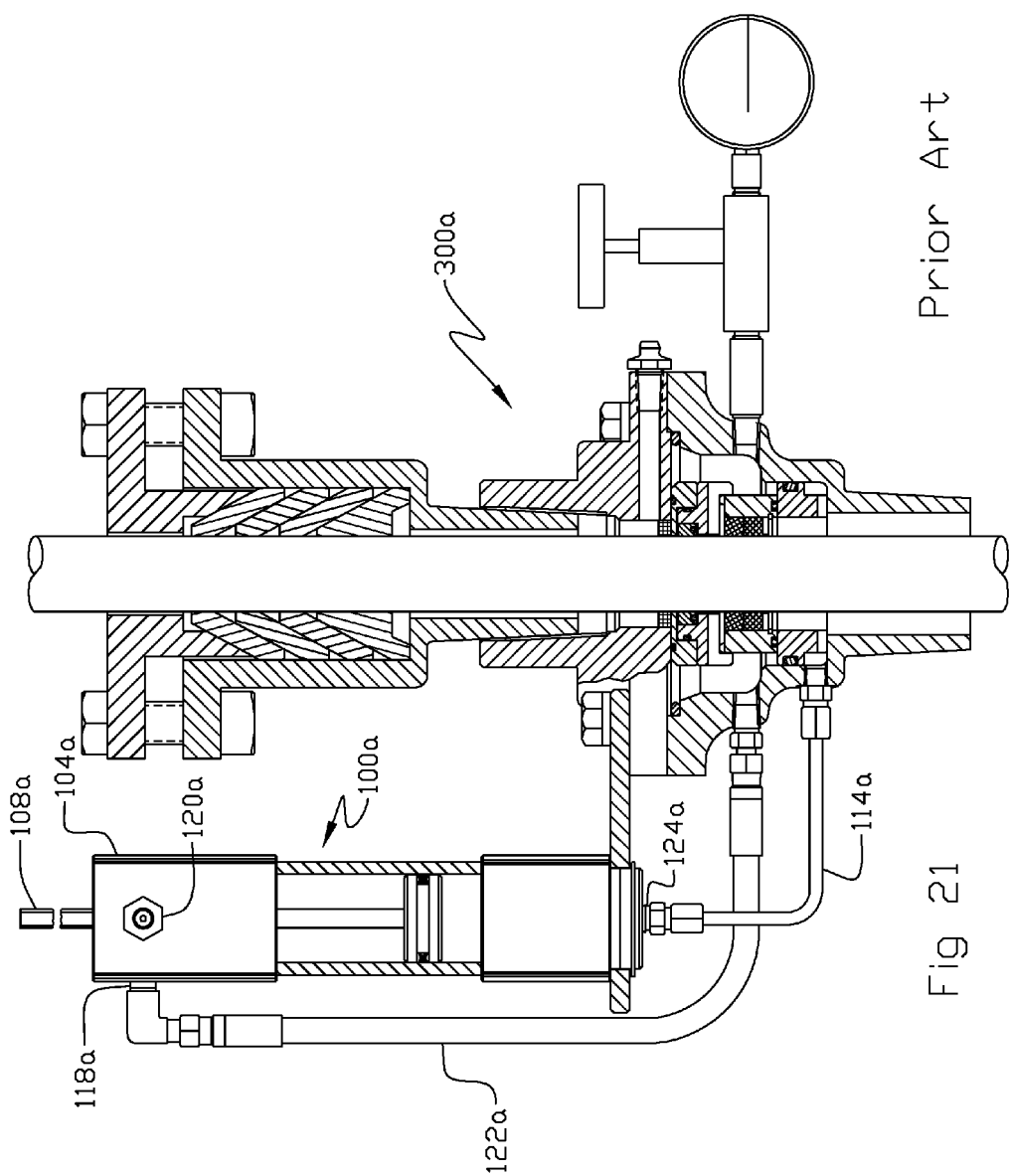
FIG. 21 is a partially sectional view of an exemplary embodiment of the prior art.

In exemplary embodiments of the prior art of the type depicted in FIGS. 19-21, the reversal of the hoses 114a, 122a results in barrier fluid being in the end of the pressure transmitter cylinder 104 through which the indicator rod 108a extends. As a result, a decrease in the amount of barrier fluid causes the indicator rod to extend further from the cylinder.

In some exemplary embodiments of the prior art of the kind illustrated in FIG. 2, FIG. 11, FIG. 17, FIG. 19, FIG. 20, and FIG. 21, a quantity of well fluids is routed to the pressure transmitter cylinder well fluid communication end from a well fluid outlet on a well flow line or from a well fluid outlet on a well fluid outlet from the well casing, eliminating the need for the hose leading from the housing first chamber.

In some exemplary embodiments and applications of the present invention the barrier fluid is either hydrocarbon based, a hydrocarbon based grease, non-hydrocarbon based, vegetable based, or animal fat based. In some exemplary embodiments and applications, the well fluid includes hydrocarbons, oil, hydrocarbon gas, and/or water.

Figure 22:
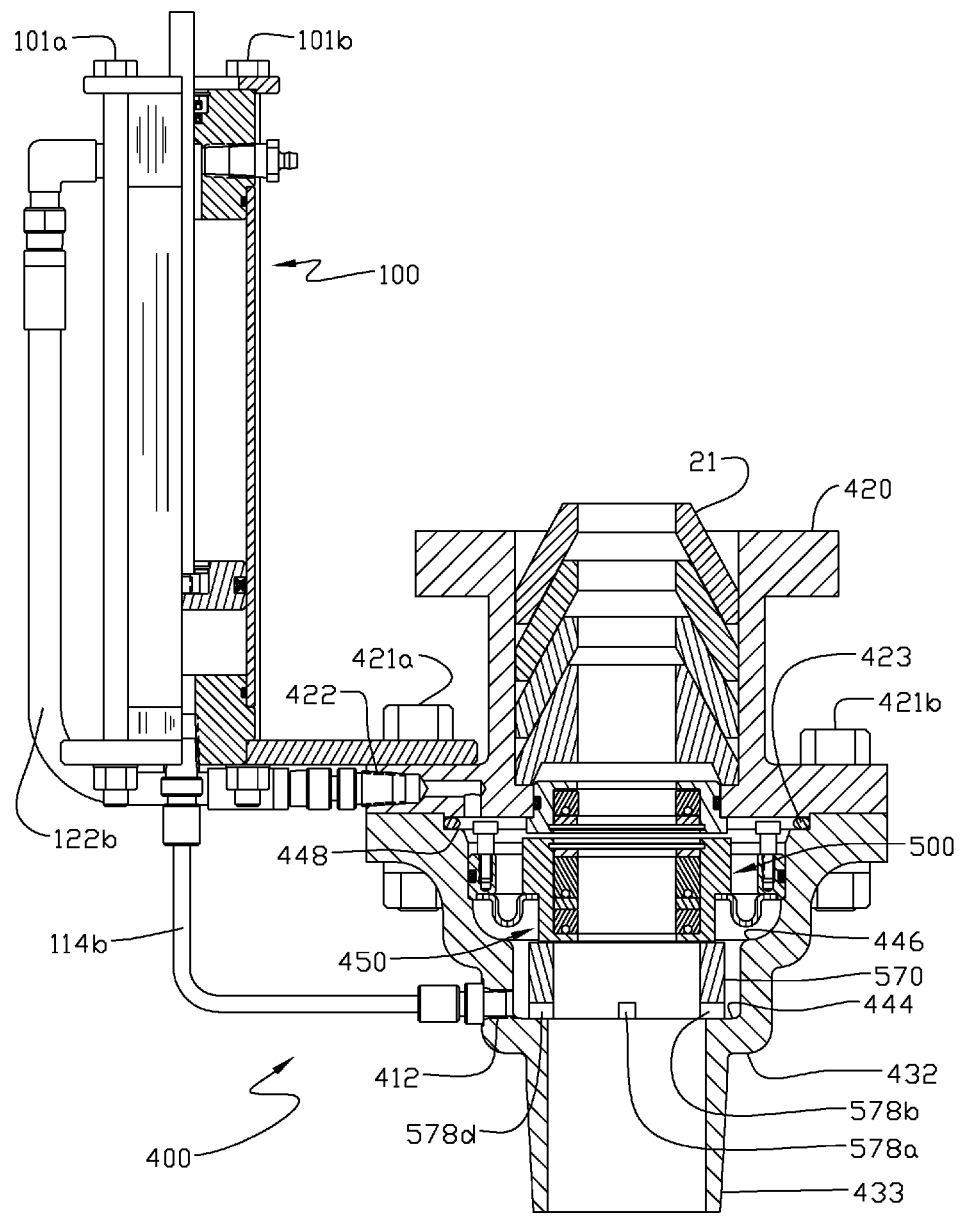
FIG. 22 is a partially sectional view of an exemplary embodiment of the present invention.

Referring now to FIG. 22, an exemplary embodiment of the secondary packing arrangement device 400 of the present invention is illustrated to have an upper housing 420 that acts as the lower portion of a single pack stuffing box having a packing seal 21 with four packing seal elements. These primary seal elements are tightenable against the polished rod 10 (shown in FIGS. 1-2) using conventional structure not shown.

Figure 23:
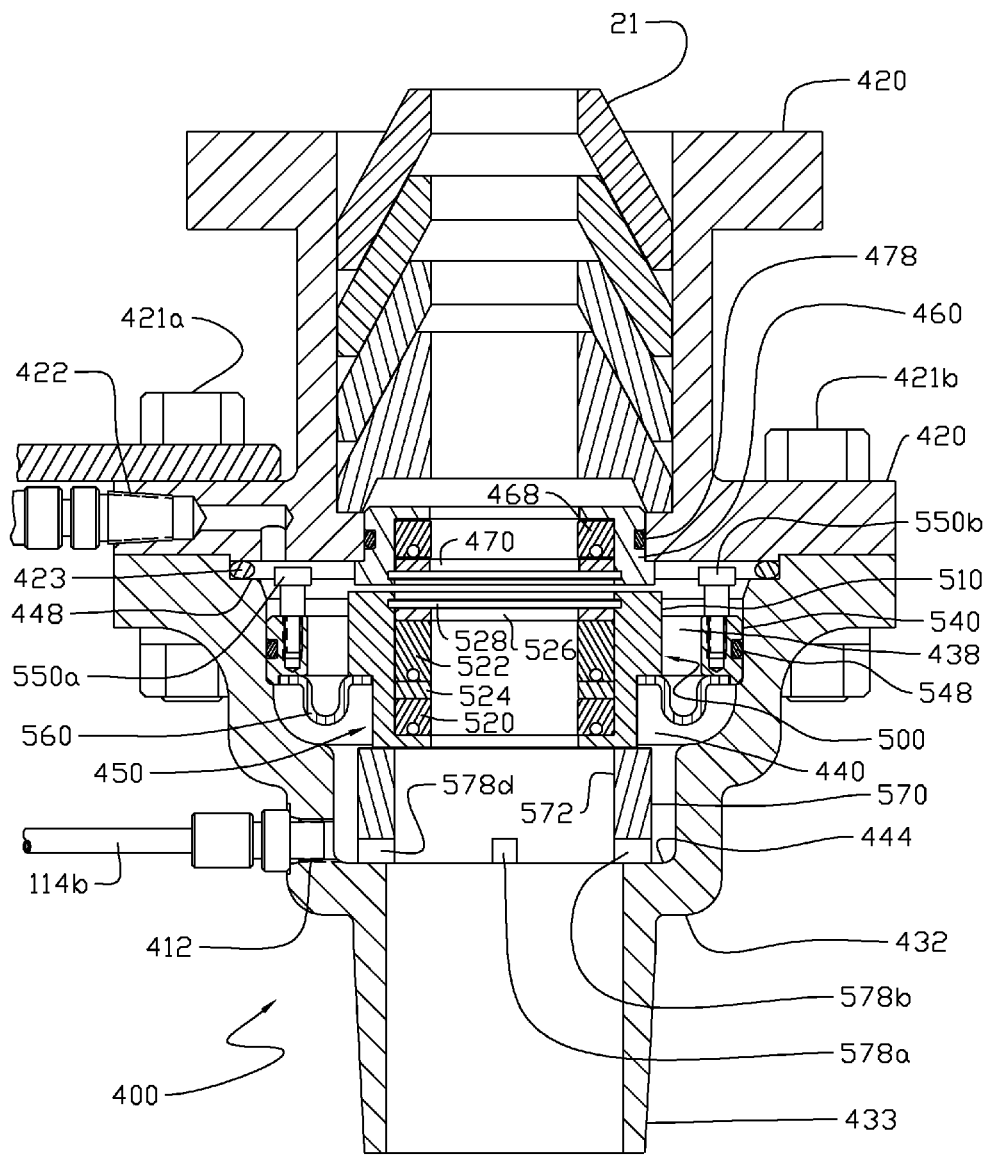
FIG. 23 is partially sectional view of a portion of an exemplary embodiment of present invention.
Figure 24:
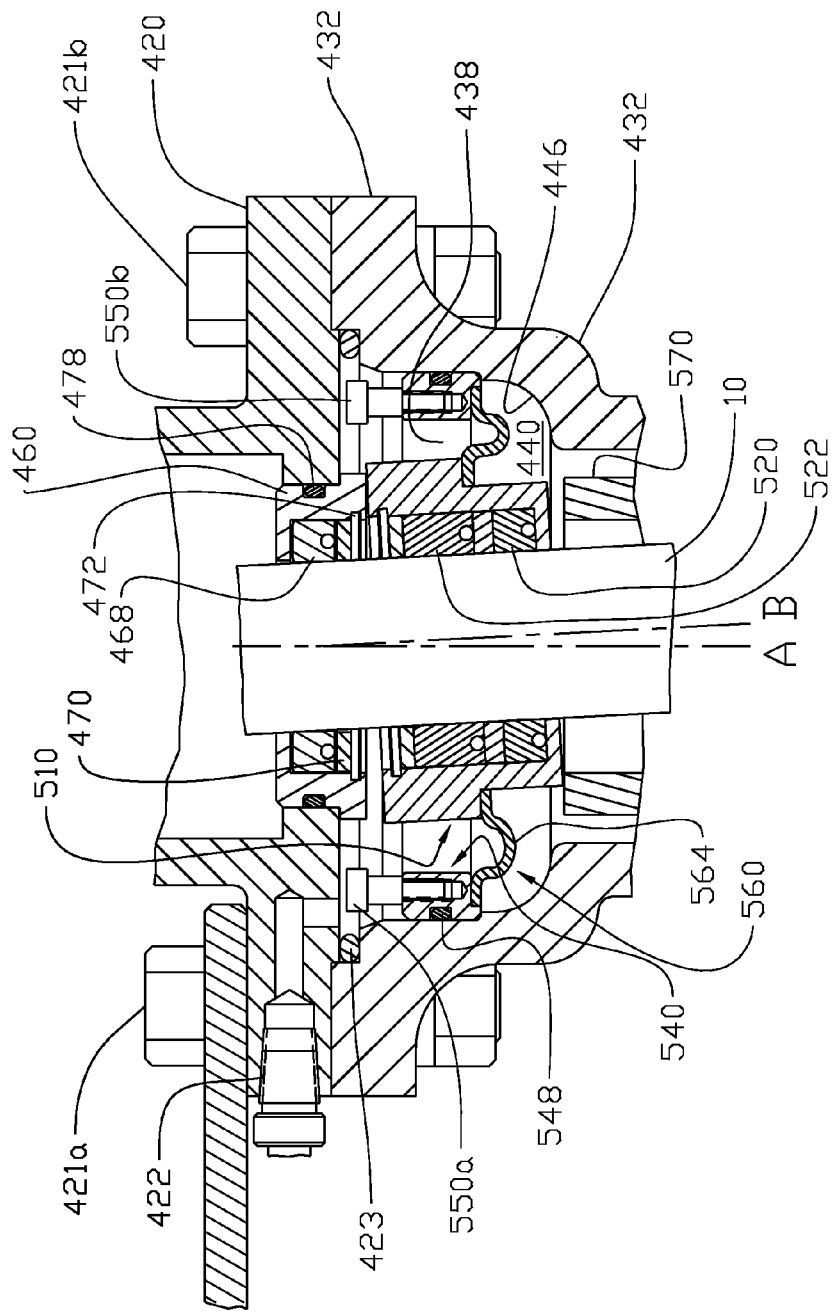
FIG. 24 is a sectional view of an exemplary embodiment of present invention.
Figure 26:
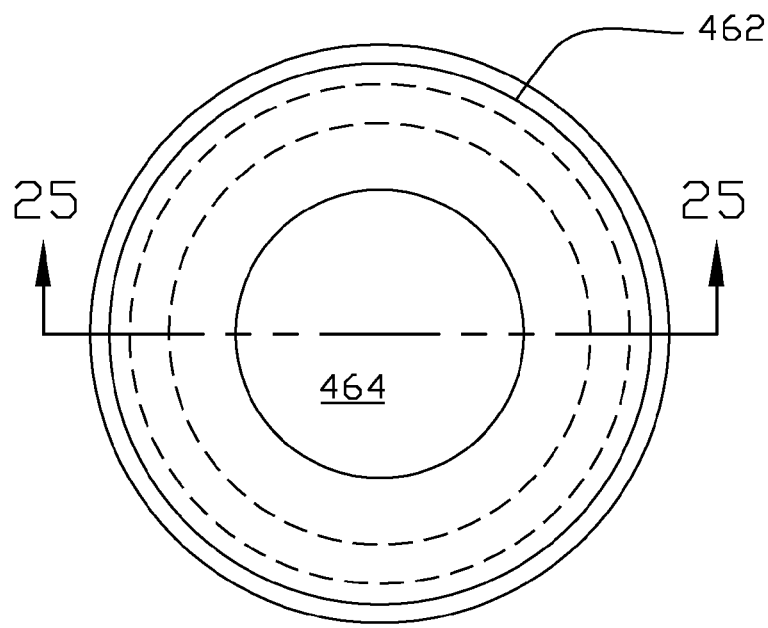
FIG. 26 is a top view of the packing assembly top portion of FIG. 25.
Figure 25:
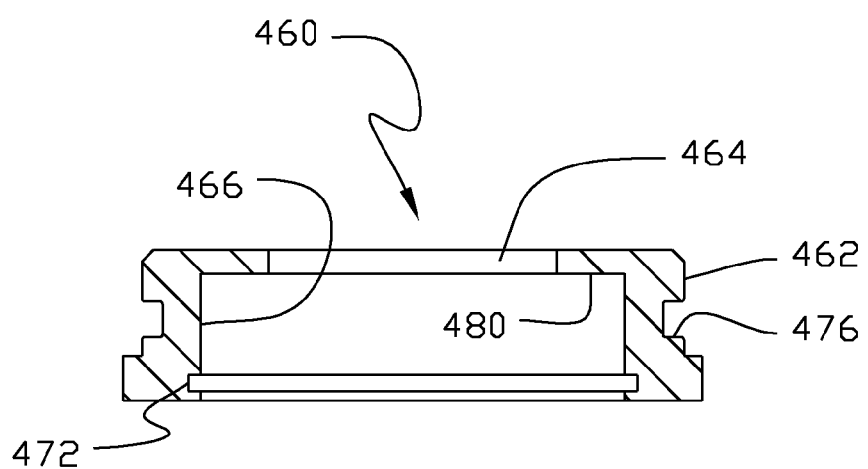
FIG. 25 is a sectional view of a packing assembly top portion of an exemplary embodiment of present invention, cut along section line 25-25 in FIG. 26.
Figure 28:
FIG. 28 is a top view of the washer of FIG. 27.
Figure 27:
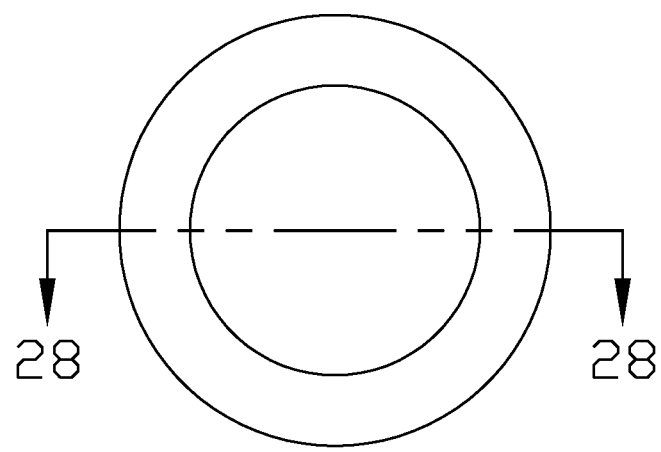
FIG. 27 is a sectional view of a washer of an exemplary embodiment of present invention, cut along section line 27-27 in FIG. 28.

In the exemplary embodiment of the present invention shown in FIG. 22 and in a closer view in FIGS. 23-24, the secondary packing arrangement 400 has a housing including the upper housing 420 and a lower housing 432 that can readily be adapted from the lower housing 16 of the conventional double pack stuffing box shown in FIG. 1, with only slight resizing of the interior. The lower housing 432 has a lower end 433 that threadably attaches to the wellhead at a well fluid outlet such that well fluids enter the lower housing. Bolted to the lower housing 432, using bolts 421a,b, two shown, is the upper housing 420. The lower housing 432 and the upper housing 420 are sealed by conventional O-ring 423 and combine to house a lower chamber 440 and an upper chamber 438. The upper chamber is not normally in fluid communication with the stuffing box packing seal 21, a packing seal element 468 and a conventional O-ring 478 preventing such communication. The lower housing 432 has a threaded outlet 412, a first shoulder 444, a second shoulder 446, and a third shoulder 448. The bolted joinder of the upper housing 420 to the lower housing 432 is sealed by a conventional O-ring 423 adjacent the third shoulder 448.

As further illustrated in FIGS. 22-24, this exemplary embodiment of the secondary packing arrangement 400 of the present invention includes a packing assembly 450, positioned within the housing upper and lower chambers 438,440 through which the polished rod 10 moves. In this exemplary embodiment, the packing assembly includes a top portion 460, a center portion assembly 500 and a bottom portion 570. As shown in more detail in FIGS. 25-26, the packing assembly top portion 460 (a "seal carrier") has a circular wall 462 forming a polished rod sized opening 464, and a larger opening 466 for closely receiving the packing seal element 468, a washer 470 (FIGS. 27-28) being integrated with the seal element 468. A shoulder 480 is formed by the diameter enlargement between the openings 464,466. The top portion 460 further has a circumferential inner groove 472 for receiving a conventional snap ring, the snap ring being similar to the snap ring 62 shown in FIG. 5. The snap ring cooperates with the shoulder 480 to retain the seal element 468 in the top portion larger opening 466. The top portion further has an outer groove 476 for receiving the conventional O-ring 478 which seals the top portion 460 against the upper housing 420.

In exemplary embodiments of the type depicted in FIGS. 22-24, the packing assembly center portion assembly 500 is illustrated in more detail in FIGS. 29-35, and is shown to have a floating portion 510 (a "packing ring cylinder") having a circular wall 512 having a polished rod sized opening 514 and a larger opening 516 for receiving two packing seal elements 520,522, each having an integrated washer 524,526. A shoulder 532 is formed by the diameter enlargement between the openings 514,516. The floating portion 510 further has an inner circumferential groove 528 for receiving a conventional snap ring of the same type as the snap ring 62, discussed above. The snap ring cooperates with the shoulder 532 for securing the seal elements 520,522 within the floating portion 510. The floating portion also has a downward facing shoulder 534.

In exemplary embodiments of the type depicted in FIGS. 22-24, and as shown in more detail in FIGS. 29-35, the packing assembly center portion assembly 500 also has a fixed portion 540 (a "seal ring") positioned on the second shoulder 446 and about the floating portion 510, the fixed portion 540 having a circular wall 542 forming an opening sized for spacing from the floating portion 510, leaving an annulus 544. The fixed portion 540 further has an outer groove 546 for closely receiving a conventional O-ring 548 which seals the fixed portion 540 against the lower housing 432. The fixed portion 540 also has two screw holes 548a,b for threadably receiving screws 550a,b, the screw heads being sized such that each acts as a stop to upward movement of the fixed portion. A downward facing shoulder 554 extends about the fixed portion 540.

Figure 29:
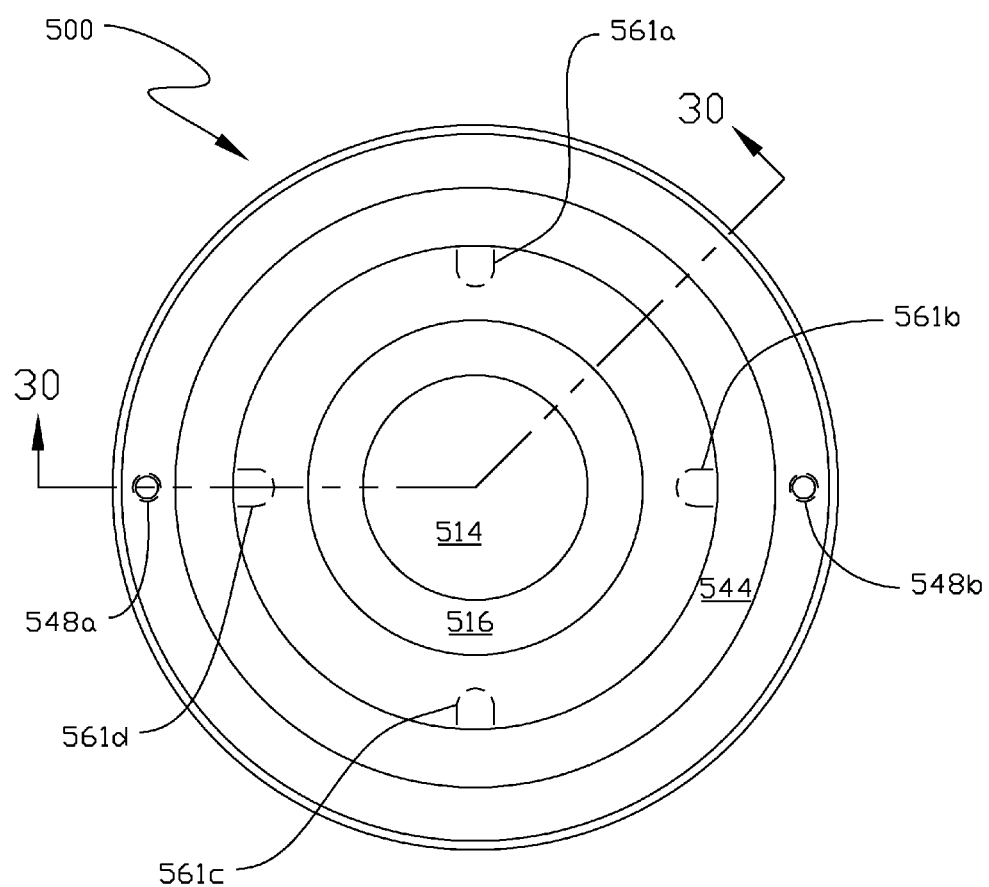
FIG. 29 is a top view of a packing assembly center portion assembly of an exemplary embodiment of the present invention.
Figure 30:
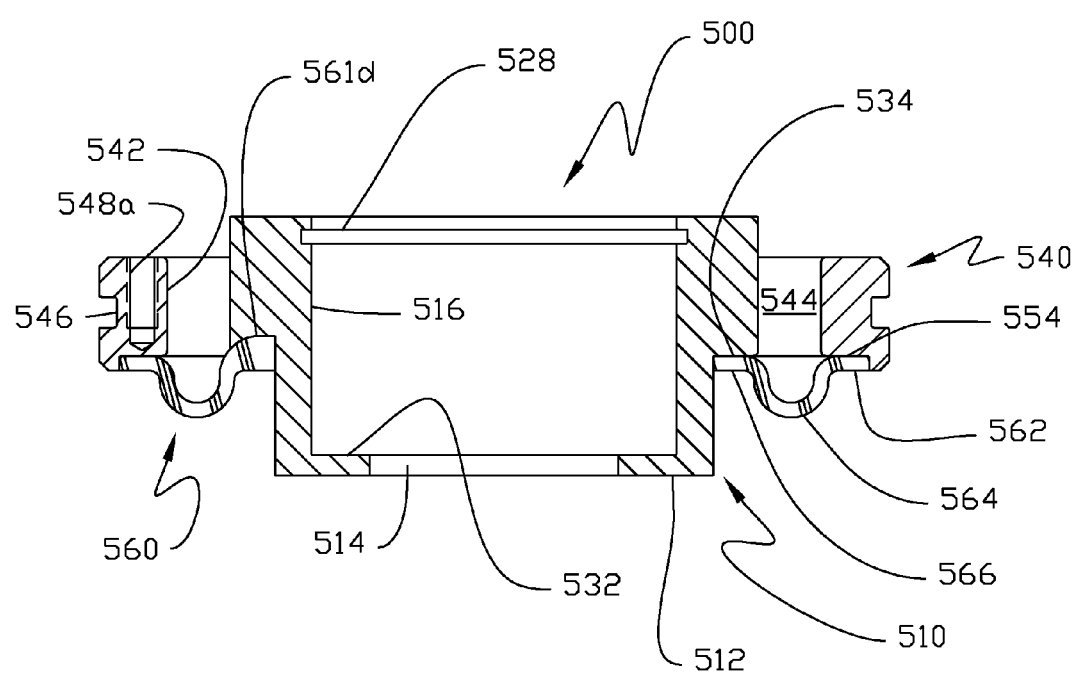
FIG. 30 is a sectional view of the packing assembly center portion assembly of FIG. 29, cut along section line 30-30 in FIG. 29.
Figure 31:
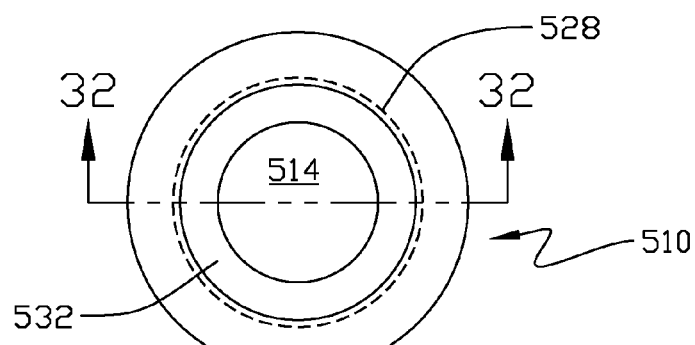
FIG. 31 is a top view of a floating packing ring cylinder of an exemplary embodiment of the present invention.
Figure 32:
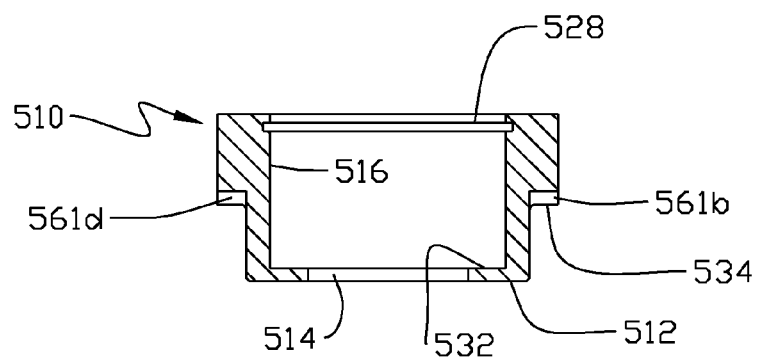
FIG. 32 is a sectional view of the floating packing ring cylinder of FIG. 31, cut along section line 32-32 in FIG. 31.
Figure 33:
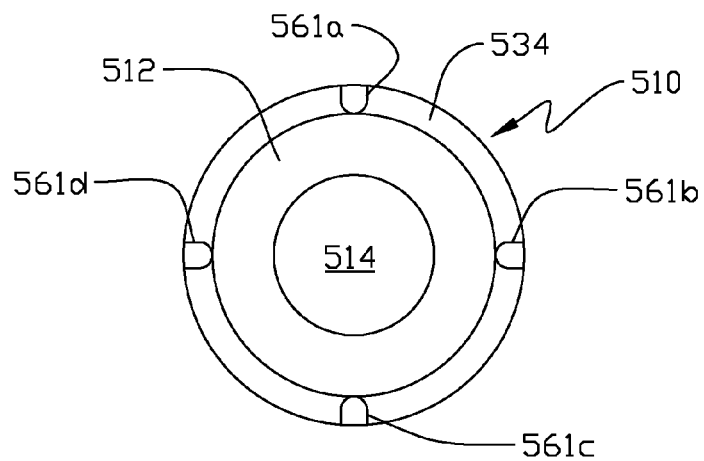
FIG. 33 is a bottom view of the floating packing ring cylinder of FIG. 31.
Figure 34:
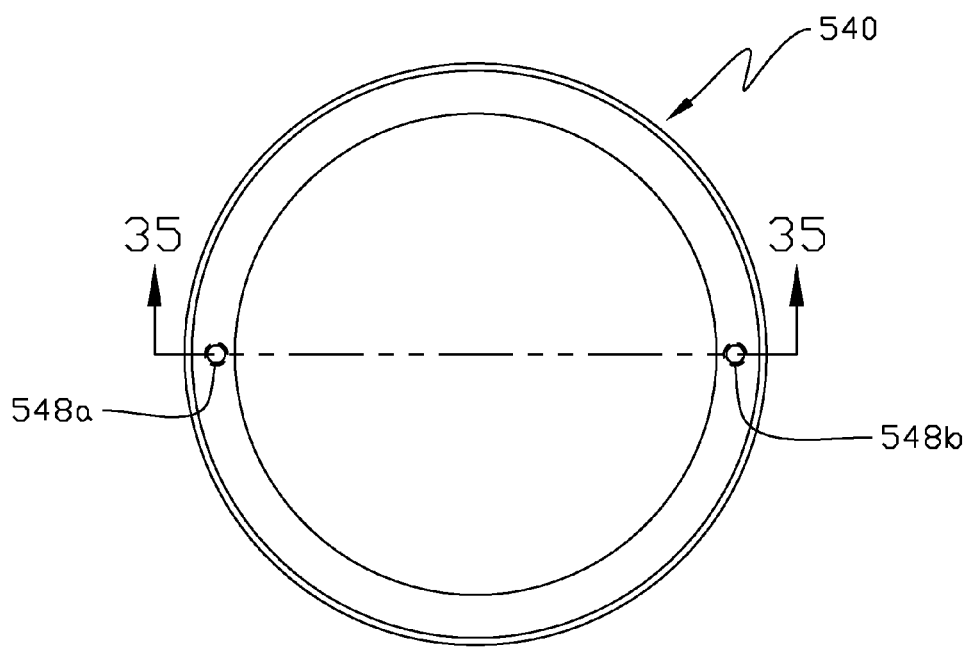
FIG. 34 is a top view of a fixed seal ring of an exemplary embodiment of the present invention.
Figure 35:
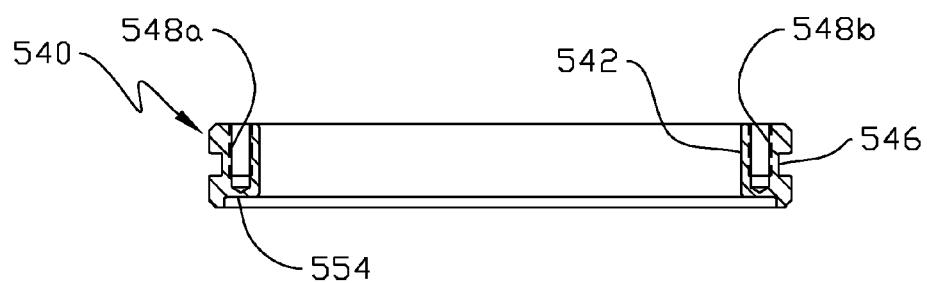
FIG. 35 is a sectional view of the fixed seal ring of FIG. 34, cut along section line 35-35 in FIG. 34.
Figure 38:
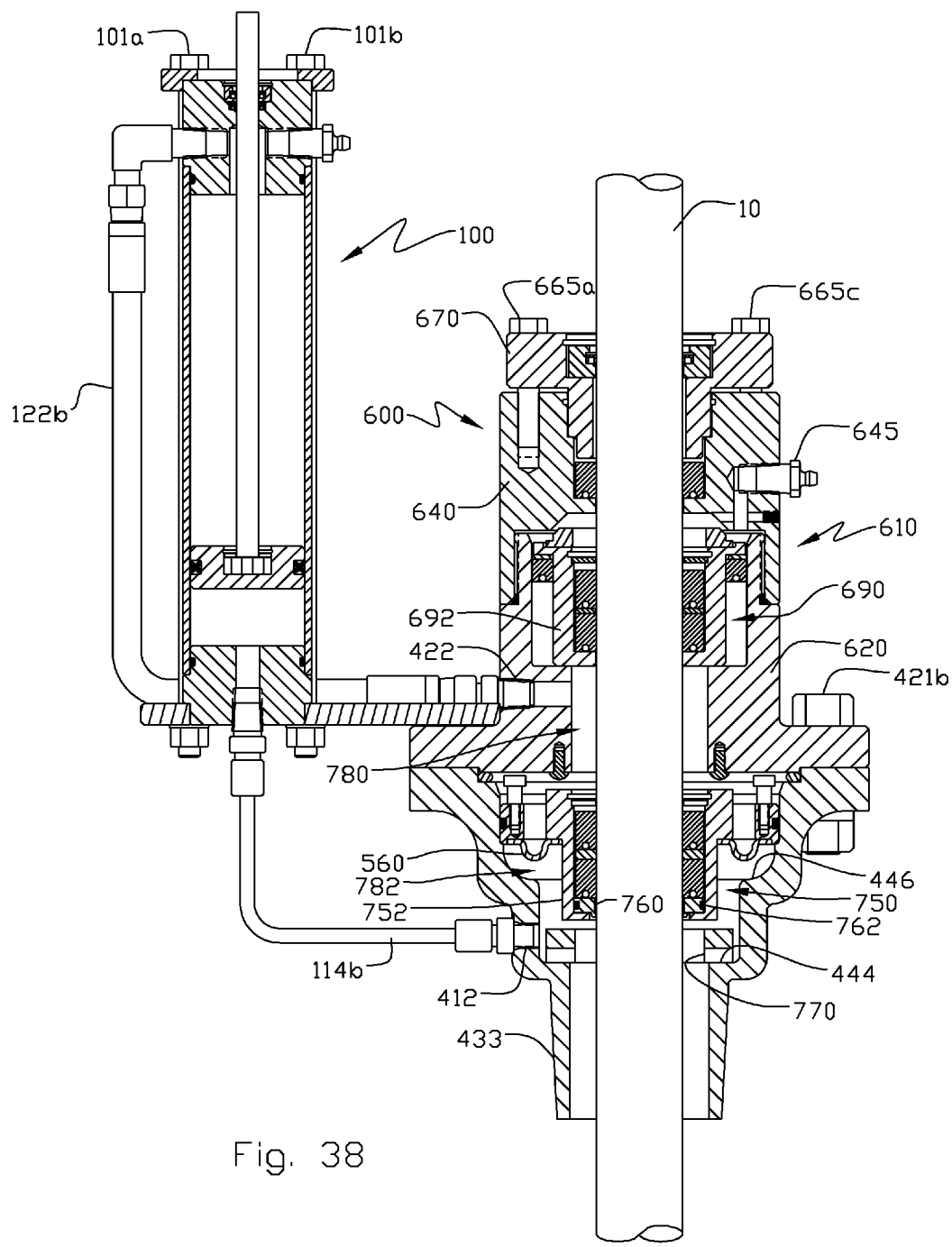
FIG. 38 is a sectional side view of an exemplary embodiment of the present invention.

In exemplary embodiments of the type depicted by FIGS. 22-24, and as shown in more detail in FIGS. 29-35, the packing assembly center portion assembly has a flexible ring 560, the ring having an outer edge 562 bonded to the fixed portion downward facing shoulder 554, an expansion bend 564, and an inner edge 566 bonded to the floating portion downward facing shoulder 534. As shown in FIGS. 29-30, slots 561a-d are positioned on the floating portion 510 on the downward facing shoulder 534. The flexible ring 560, during original attachment will fill such slots when melted, as particularly shown in FIG. 30. This vertical extension of the flexible ring 560 helps resist twisting and relative motion of the ring 560 and the downward facing shoulder 534. The flexible ring 560 separates the housing upper chamber 438 and the lower chamber 440. The expansion bend 564 can deform to allow the floating portion 510 to move or float with respect to the fixed portion 540 to accommodate variations in the movement of the polished rod 10, as much as ⅜ inch in the lateral direction. FIG. 24 illustrates the movement of the floating portion 510 with respect to the fixed portion 540, as the floating portion 510 accommodates an angular position of the polished rod 10. As illustrated in FIG. 24, opposing portions of the expansion bend 564 will correspondingly compress or expand as needed.

In exemplary embodiments of the type depicted in FIGS. 22-24, and as shown in more detail in FIGS. 36-37, the packing assembly bottom portion 570 has a circular wall 572 having an opening 574, the bottom portion 570 being sized to provide a top surface 576 that supports the center portion assembly floating portion 510. The bottom portion has four passages 578a-d for allowing fluid communication with the housing lower chamber 440 from the bottom portion interior, the bottom portion 570 being supported by the lower housing first shoulder 444.

A pressure transmitter 100, substantially similar to the transmitter depicted with respect to the prior art in FIG. 19 and is used for similar purposes, the transmitter in this exemplary embodiment being assembled using four bolts 101a-b, two shown, as illustrated in FIG. 22. In the exemplary embodiments of the present invention depicted in FIGS. 22-24, the upper housing 420 has an inlet 422 for establishing barrier fluid communication with the transmitter through a barrier fluid line 122b, while the lower housing outlet 412 establishes well fluid communication with the transmitter through a well fluid line 114b. In operation well fluid passes through the lower housing lower end 433 into the lower chamber 440, where a portion of the well fluid exits the secondary packing assembly lower portion 572 through lower portion passages 578a-d, then through the lower housing outlet 412, and then through well fluid line 114b to enter the pressure transmitter 100. The reaction of the transmitter is to move barrier fluid from the pressure transmitter 100, through barrier fluid line 122b, through upper housing inlet 422, and into the upper chamber 438. The appropriate amount of barrier fluid is moved to balance the pressures in the upper chamber 438 and the lower chamber 440, across the flexible ring expansion bend 564.

As depicted in FIG. 24, movements of the polished rod 10 having a lateral component, cause the secondary packing assembly floating portion 510 to rotate from the vertical position shown in FIG. 22, while maintaining the seals 520,522 in their original orientation against the polished rod 10. In exemplary embodiments of the type shown in FIG. 22-24, the approximate angle through which the floating portion 510 may rotate is illustrated by the angle between line "A," a reference line representing a substantially vertical floating portion 510, and line "B," a reference line representing the center line of the tilted floating portion. Field experience indicates that exemplary embodiments of the present invention depicted in FIGS. 22-24, allow lateral motion of approximately ⅜ inch and rotation of the floating portion 510 through an angle of approximately 3.5 degrees. During such rotation of the floating portion 510, the top portion 460, the center portion assembly fixed portion 540, and the bottom portion 570 are substantially fixed, and the flexible ring 560 is flexing through the expansion bend 564.

In exemplary embodiments of the type depicted in FIGS. 22-24, secondary packing assembly top portion 460, the floating portion 510, the fixed portion 540, and the bottom portion 570 are constructed from bronze, and the flexible ring is constructed an elastomer with appropriate physical and chemical properties for the well fluid conditions, and is heat bonded to the packing ring cylinder shoulder 534 and the seal ring shoulder 554. In some exemplary embodiments nitrile or fluoro elastomers are suitable materials for construction of the flexible ring.

Turning now to FIGS. 63-68, wherein alternate and additional components are depicted for use in some exemplary embodiments including some exemplary embodiments similar to exemplary embodiments depicted in FIGS. 22-24. For example, in some exemplary embodiments the packing ring cylinder 510 with cylinder wall 512 is replaced by a modified cylinder 752 with a longer cylinder wall 754 (FIGS. 65-66), a wiper 760 with O-ring 762 is provided (FIGS. 63-64), and the bottom portion 570, is replaced by a modified bottom portion 770 (FIGS. 65-68).

Turning now to FIGS. 38-68, wherein exemplary embodiments of the present invention are depicted which are usable with exemplary embodiments of the several packing assemblies described above. In some exemplary embodiments of the type depicted in FIGS. 38-68, a packing unit 600 is provided having an upper housing 610 and a lower housing 432, the housing, as a whole, having a chamber, and a packing assembly, positioned within the housing chamber, through which the polished rod moves. The packing assembly again has a center portion 750, the center portion being sealed against the housing, using flexible seal 560, to divide the housing chamber into an upper chamber 780 and a lower chamber 782. The well fluids are received in the housing lower chamber and such fluids pressure the packing assembly center portion. The packing assembly includes a bottom portion 770 discussed above with respect to earlier described exemplary embodiments. The bottom portion retains and supports the center portion 750 within the housing, As in earlier described exemplary embodiments, the housing upper chamber contains a barrier fluid which pressures the packing assembly center portion from above. The pressure transmitter 100 is again usable for balancing the barrier fluid pressure and well fluids pressure across the center portion flexible seal 560.

Figure 39:
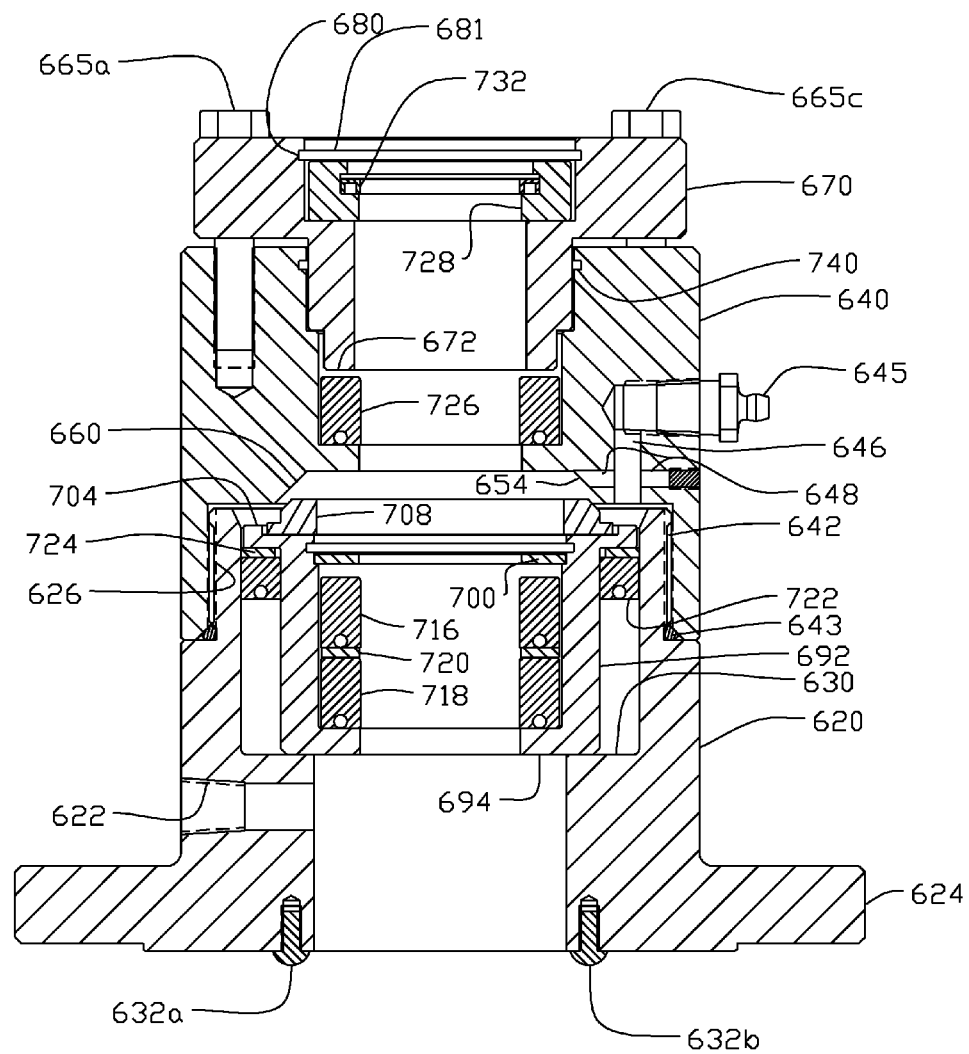
FIG. 39 is a sectional side view of the upper housing of an exemplary embodiment of the present invention.
Figure 40:
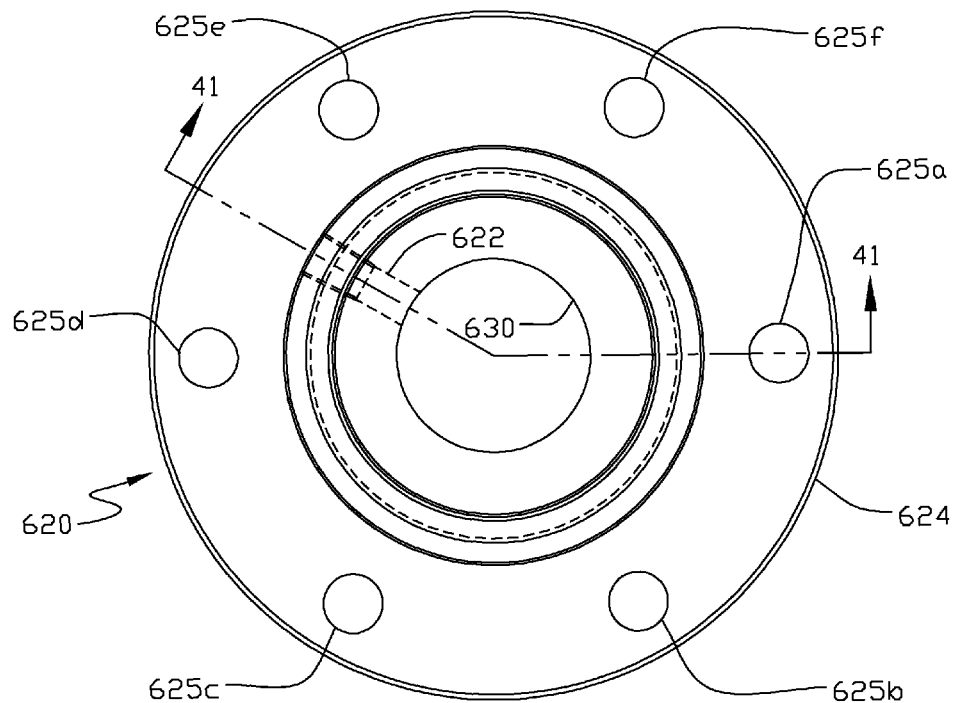
FIG. 40 is a top view of the upper housing first substructure of an exemplary embodiment of the present invention.
Figure 41:
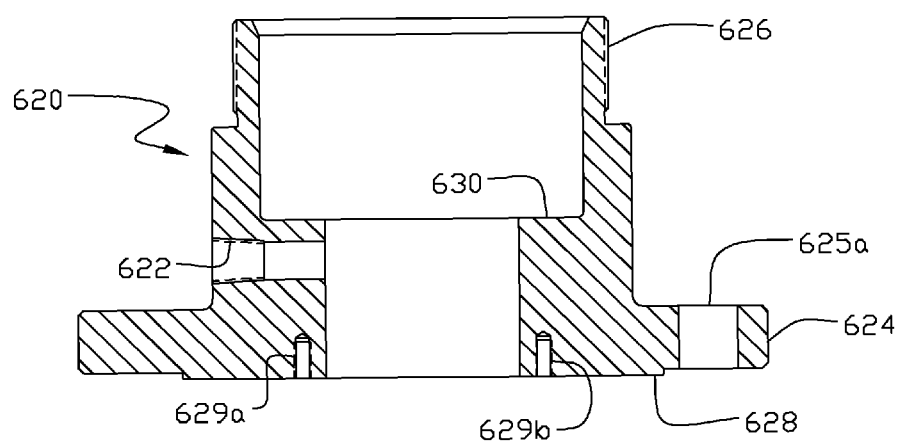
FIG. 41 is a sectional view of the upper housing first substructure of FIG. 40, cut along section line 41-41 in FIG. 40.

For exemplary embodiments of packing unit 600 of the type depicted in FIGS. 38-68, and as shown in more detail in FIG. 39, the unit is now shown to comprise an upper housing 610, the upper housing having a first sub-structure 620 attached to a lower housing 432, using conventional bolts 421*b*, and flange 624, the flange 624 having bolt holes 625*a-f*, as shown in more detail in FIGS. 40 and 41. The upper housing first sub-structure 620 has an inlet 622 for receiving the barrier fluid line 422 from the pressure transmitter 100, a flange 624, a threaded upper end 626, a bottom flange surface 628, an interior upward facing shoulder 630, and two threaded holes 629*a-b* in the bottom flange surface 628 for receiving standoff screws 632*a-b*.

Figure 42:
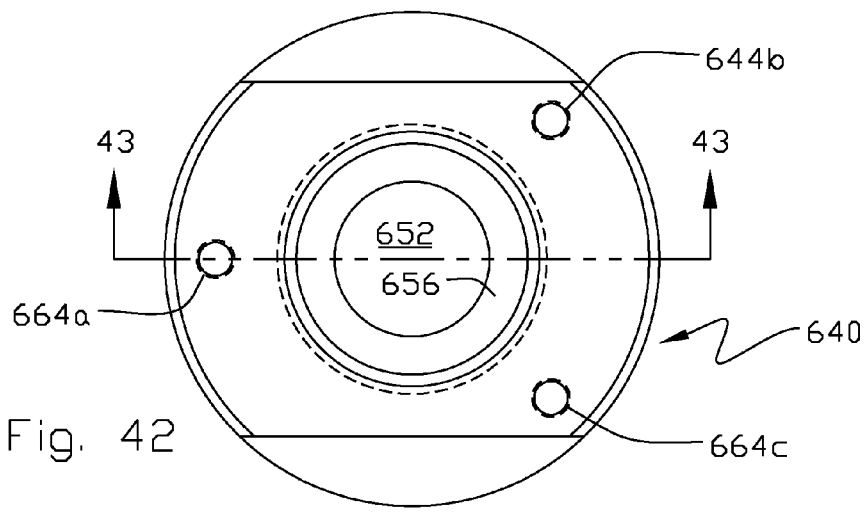
FIG. 42 is a top view of the upper housing second substructure of an exemplary embodiment of the present invention.
Figure 43:
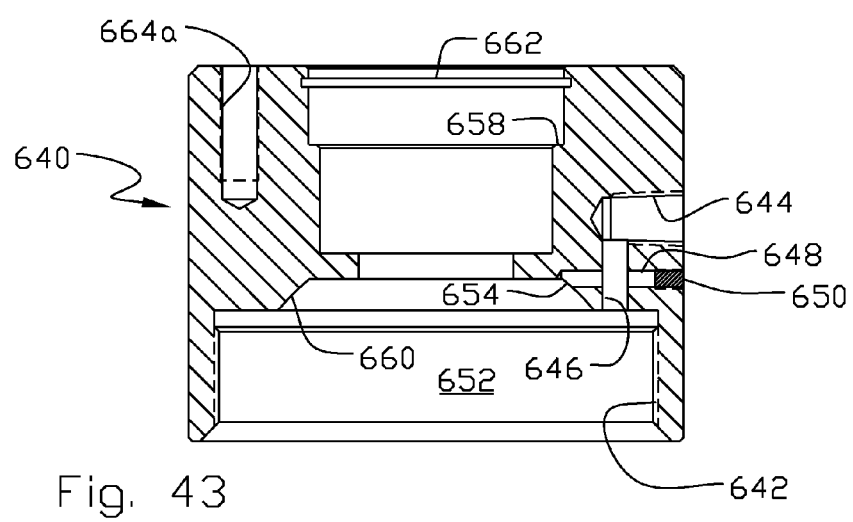
FIG. 43 is a sectional view of the upper housing second sub-structure FIG. 42, cut along section line 43-43 in FIG. 42.
Figure 44:
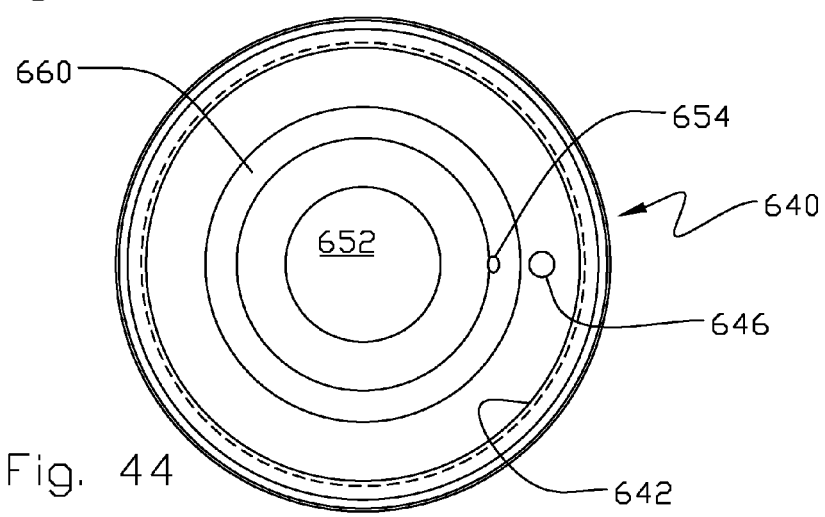
FIG. 44 is a bottom view of the upper housing second sub-structure of an exemplary embodiment of the present invention.

In some exemplary embodiments of the present invention of the type depicted in FIGS. 38-68, and as shown in more detail in FIGS. 39-41, the upper housing first sub-structure threaded upper end 626 threadably connects to an upper housing second sub-structure 640 at threaded bottom end 642, the connection being sealed using O-ring 643, the second sub-structure being shown in more detail in FIGS. 42-44. The second sub-structure 640 has a grease inlet 644 for receiving a conventional grease fitting 645, the inlet continuing to passage 646 and a branch passage 648. Grease passage 646 continues as a branch to the interior of first sub-structure. Grease inlet 648 continues to the interior 652 of the second sub-structure 640, entering the interior 652 through grease inlet end 654 at a smaller diameter portion of a downward facing shoulder 660 with a gradually increasing diameter. The interior 652 of upper housing second sub-structure 640 has an enlarged diameter creating a first upward facing shoulder 656, an additional enlarged diameter creating a second upward facing shoulder 658, a circumferential snap ring groove 662, and three threaded bolt holes 664*a-c*, for receiving bolts 665*a-c* (bolt 665*b* not shown).

Figure 45:
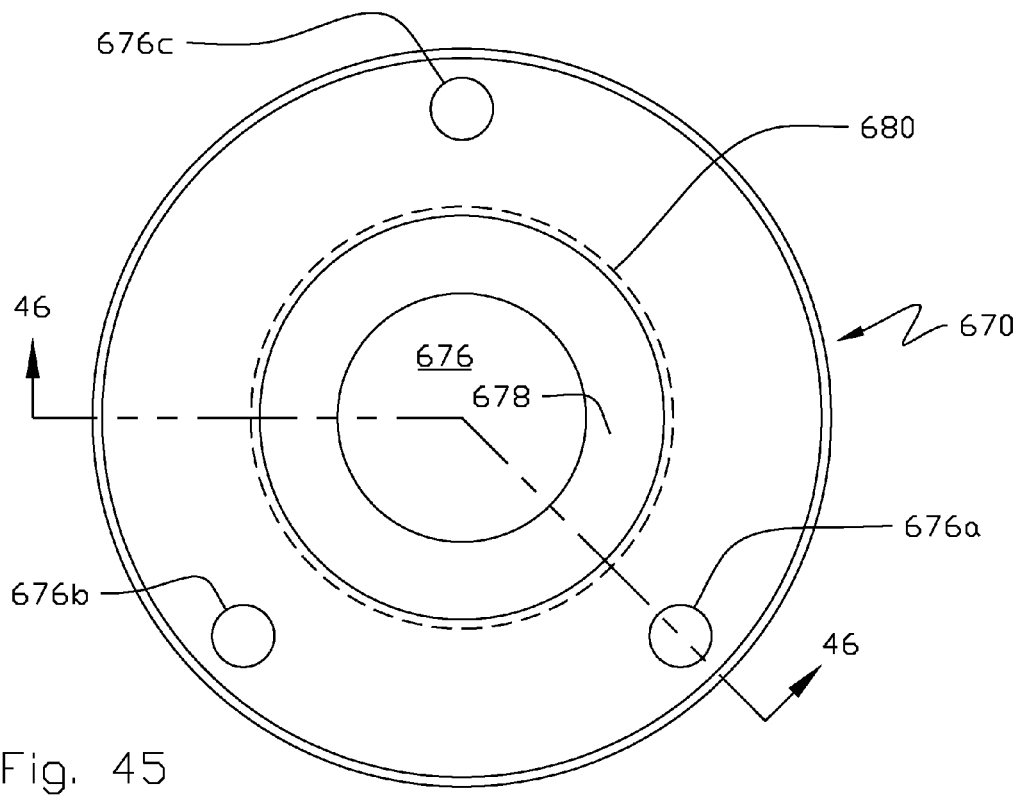
FIG. 45 is a top view of the upper housing second sub-structure top member of an exemplary embodiment of the present invention.
Figure 46:
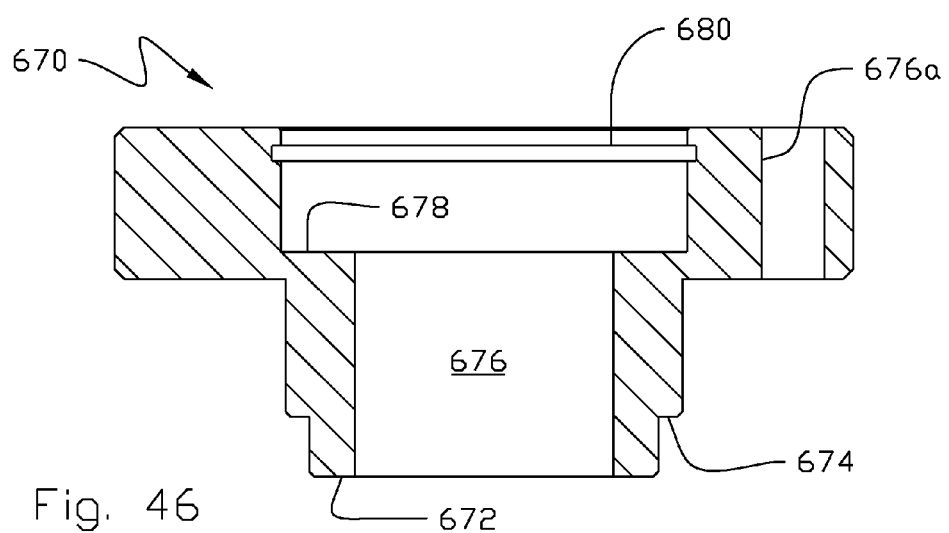
FIG. 46 is a sectional view of the upper housing second sub-structure top member of FIG. 45, cut along section line 46-46 in FIG. 45.

In some exemplary embodiments of the present invention of the type depicted in FIGS. 38-68 and as shown in more detail in FIGS. 45-46, the upper housing second sub-structure has a removable top member 670, bolted to the upper housing second sub-structure using bolt holes 676*a-c* (alignable with second sub-structure bolt holes 665*a-c*). The top member 670 comprises a bottom end 672, a reduction in the bottom end diameter forming a downward facing shoulder 674, an interior 676, with an enlarged diameter forming an upward facing shoulder 678, and a circumferential snap ring groove 680 for receiving snap ring 681.

Figure 47:
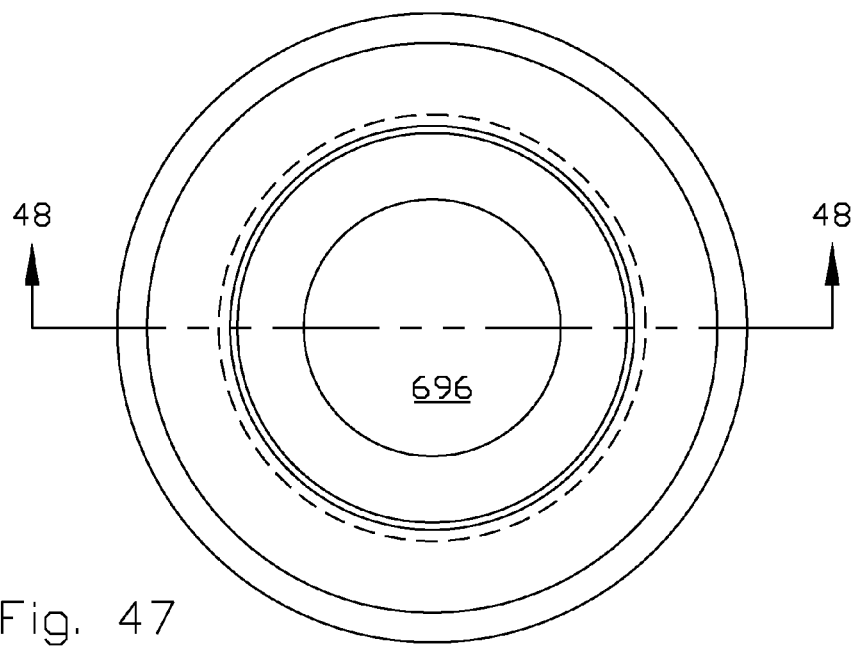
FIG. 47 is a top view of the seal positioner of an exemplary embodiment of the present invention.
Figure 48:
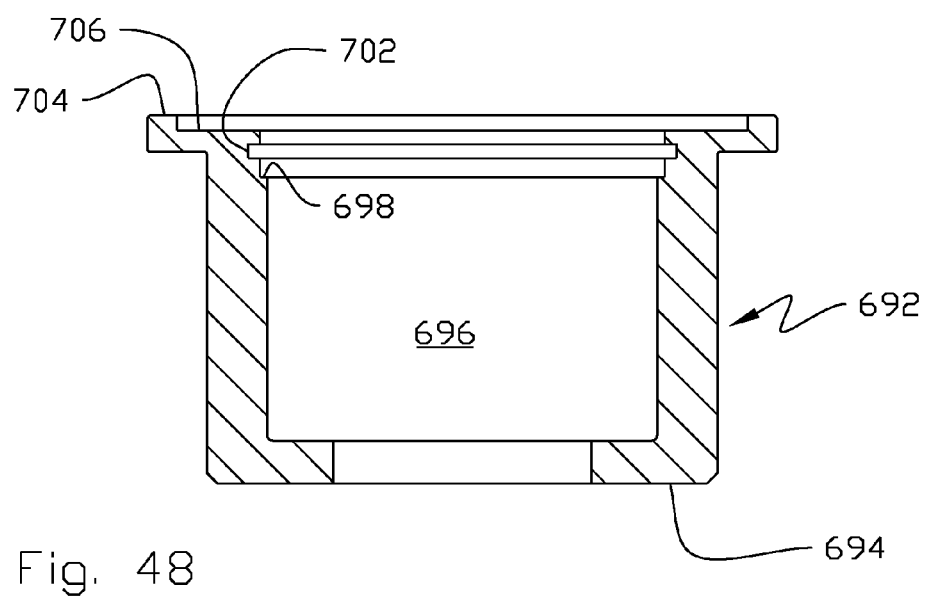
FIG. 48 is a sectional view of the seal positioner of FIG. 49, cut along section line 48-48 in FIG. 47.
Figure 49:
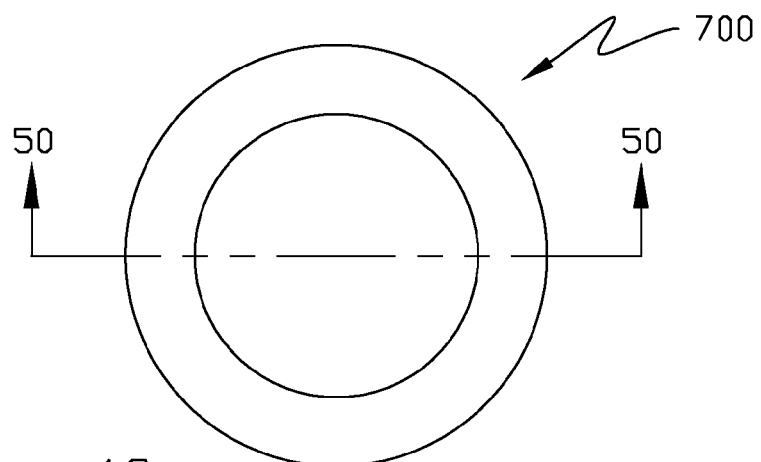
FIG. 49 is a top view of a seal retainer ring of an exemplary embodiment of the present invention.
Figure 50:
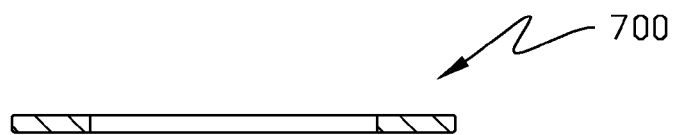
FIG. 50 is a sectional view of the seal retainer ring of FIG. 49, cut along section line 50-50 in FIG. 49.
Figure 51:
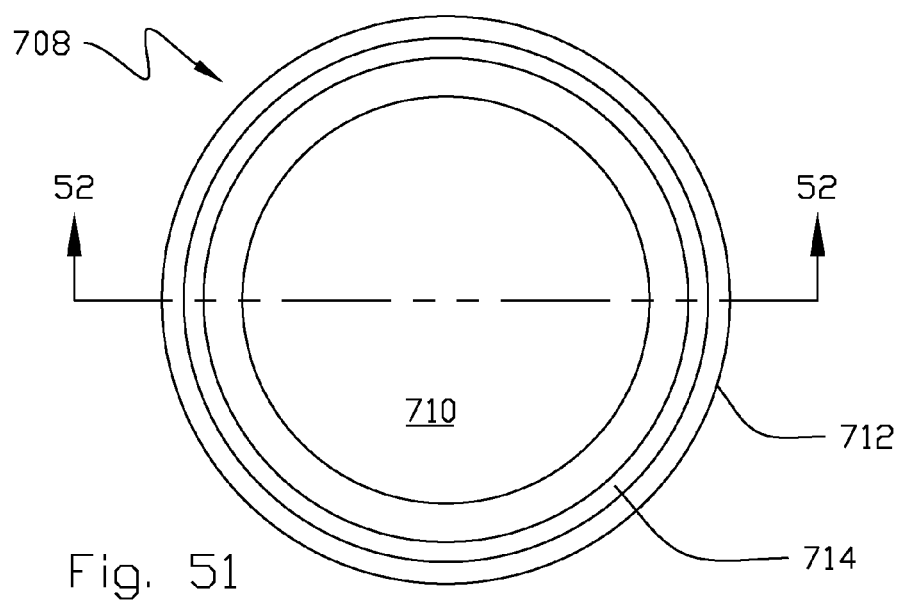
FIG. 51 is a top view of the load ring of an exemplary embodiment of the present invention.
Figure 52:
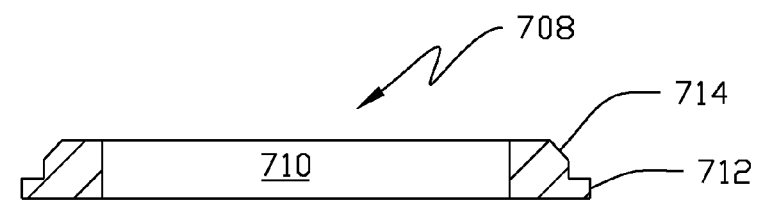
FIG. 52 is a sectional view of the load ring of FIG. 51, cut along section line 52-52 in FIG. 51.
Figure 53:
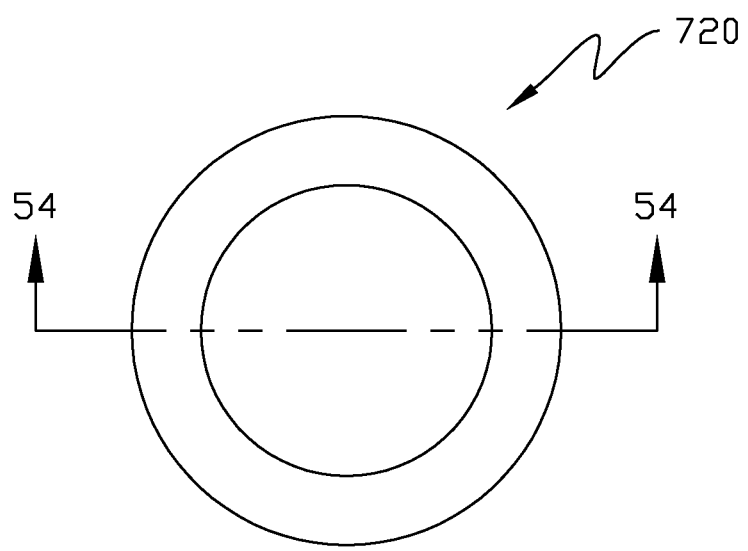
FIG. 53 is a top view of a spacer ring of an exemplary embodiment of the present invention.
Figure 54:
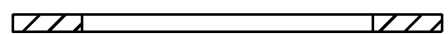
FIG. 54 is a sectional view of the spacer ring of FIG. 53, cut along section line 54-54 in FIG. 53.
Figure 55:
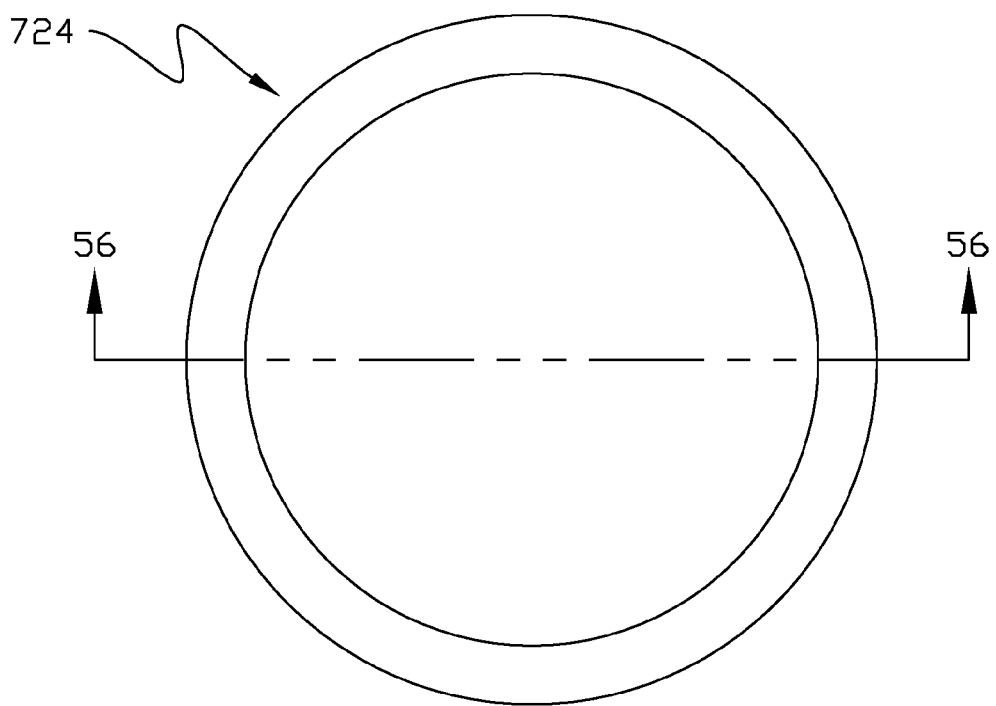
FIG. 55 is a top view of a back up ring of an exemplary embodiment of the present invention.
Figure 56:
FIG. 56 is a sectional view of the backup ring of FIG. 50, cut along section line 56-56 in FIG. 55.
Figure 57:
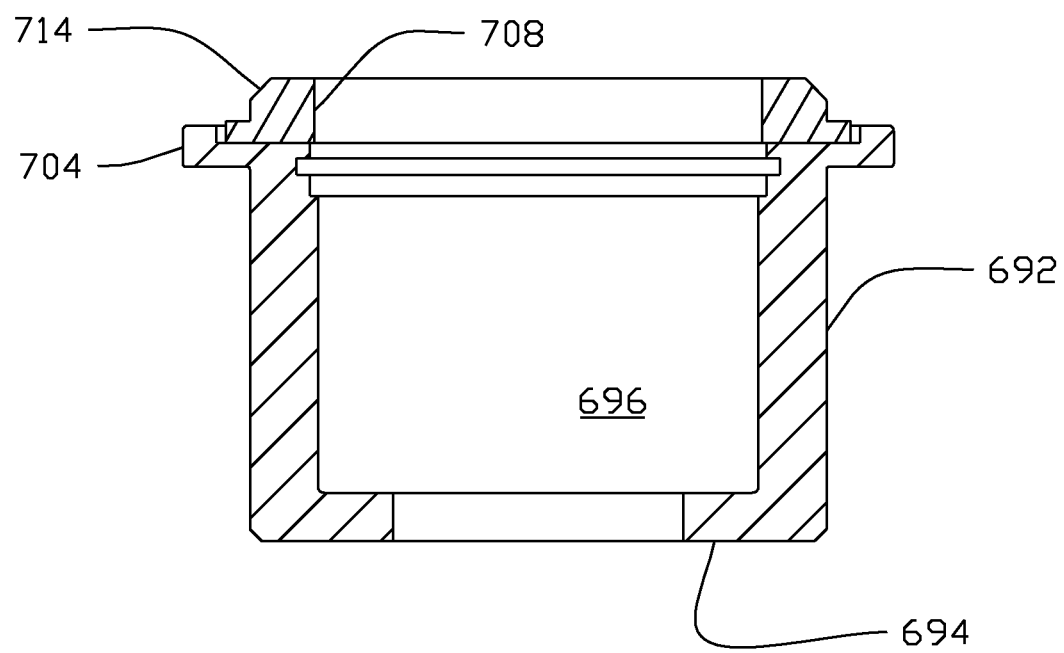
FIG. 57 is a sectional side view of the load ring of FIG. 51, cut along section line 52-52 in FIG. 51 and a sectional view of the seal positioner of FIG. 47, cut along section line 48-48 in FIG. 47.

In some exemplary embodiments of the present invention of the type depicted in FIGS. 38-68, a seal positioner assembly 690 having a seal positioner 692 is positioned in the upper housing first sub-structure 620, as shown in more detail in FIGS. 38-39, FIGS. 47-50 and FIGS. 57-59. The seal positioner 692 has a bottom 694, an interior 696, an enlarged interior diameter forming an upward facing shoulder 698 for positioning a retaining ring 700 (FIGS. 49-50) beneath a snap ring in a circumferential groove 702. As shown in FIGS. 47-48, the seal positioner 692 has a top portion 704 presenting an upward facing enlarged diameter recess 706. As shown in more detail in FIGS. 51-52 and FIGS. 57-59, there is positioned in such recess a load ring 708 having an interior 710, a bottom 712 with a diameter less than the recess 706 diameter, and an upward facing bevel 714. In some exemplary embodiments, the recess diameter is approximately 3.350 inches mm and the load ring bottom 712 diameter is approximately 3.250 inches. Within the seal positioner are packing seals 716,718 separated by spacer ring 720 (FIGS. 53,54). Seal 722 is positioned in the annulus between the seal positioner 692 and the inside wall of the first sub-structure 620.

Figure 58:
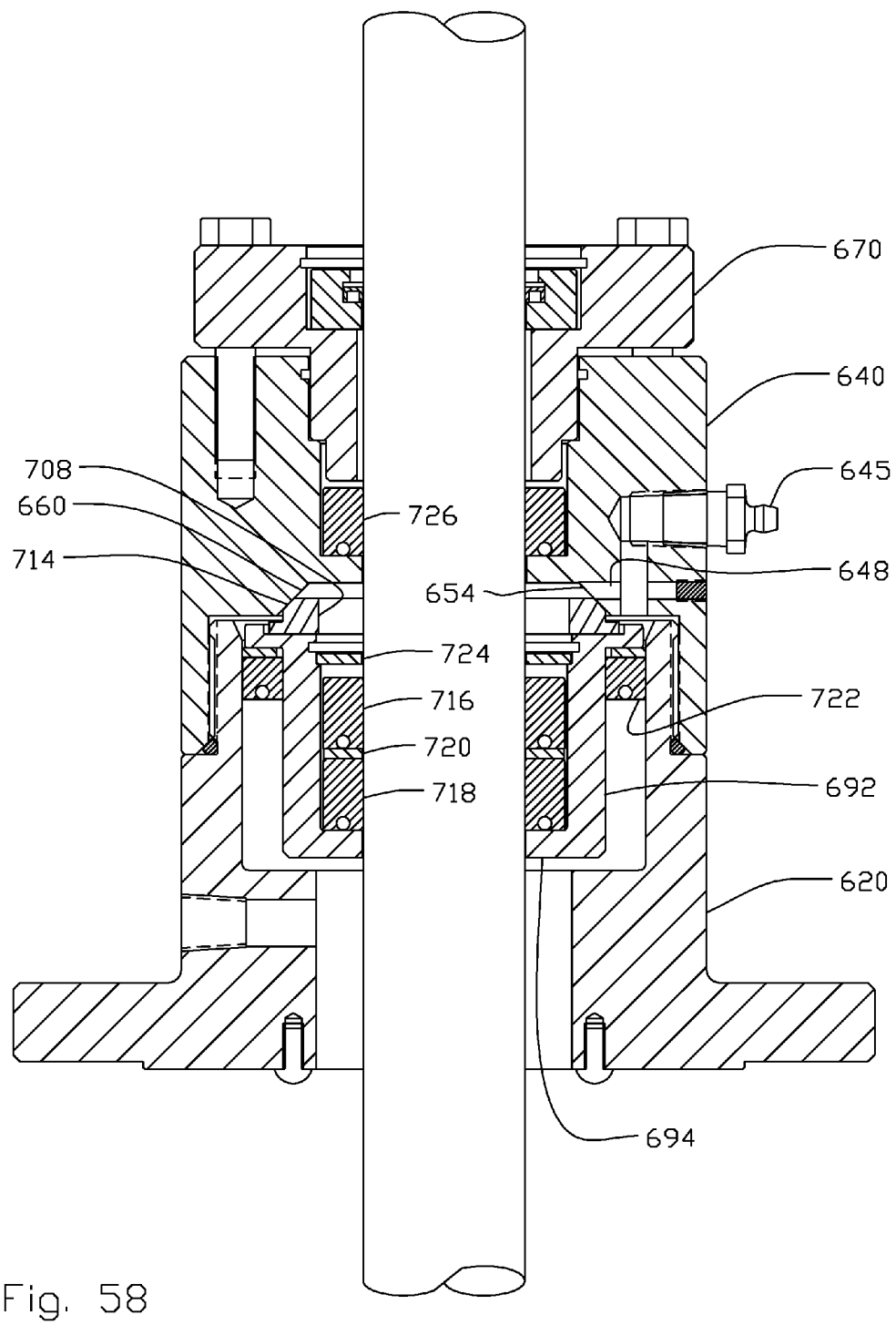
FIG. 58 is a sectional side view of the upper housing in an exemplary embodiment of the present invention.
Figure 59:
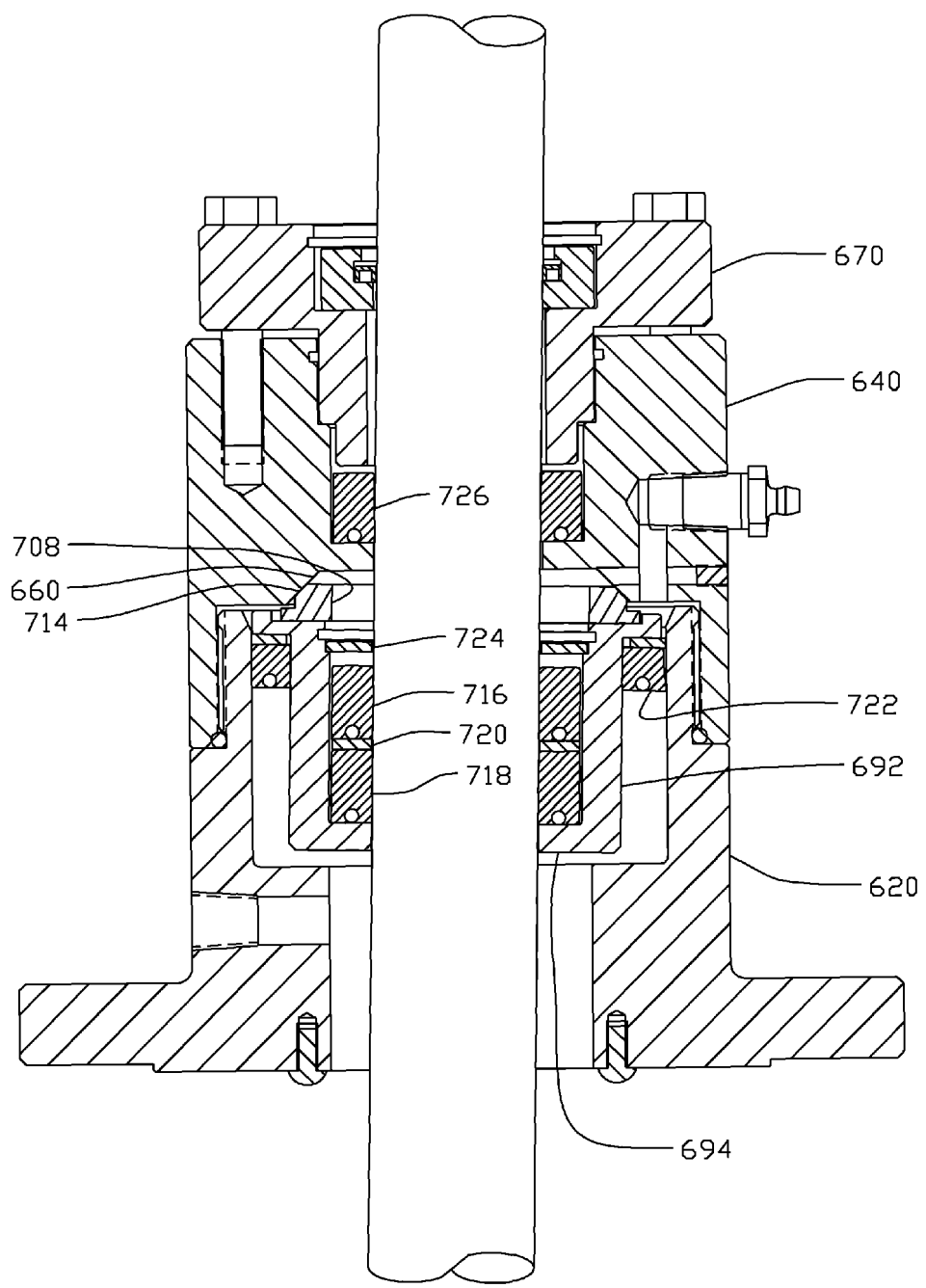
FIG. 59 is a sectional side view of the upper housing in an exemplary embodiment of the present invention.
Figure 60:
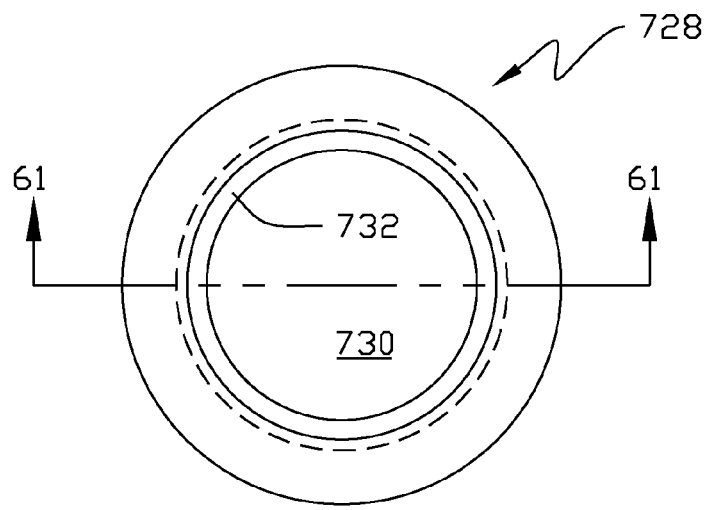
FIG. 60 is a top view of a wiper holder of an exemplary embodiment of the present invention.
Figure 61:
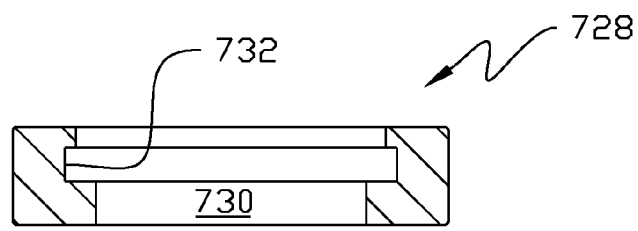
FIG. 61 is a sectional view of the wiper holder of FIG. 60, cut along section line 61-61 in FIG. 60.
Figure 62:
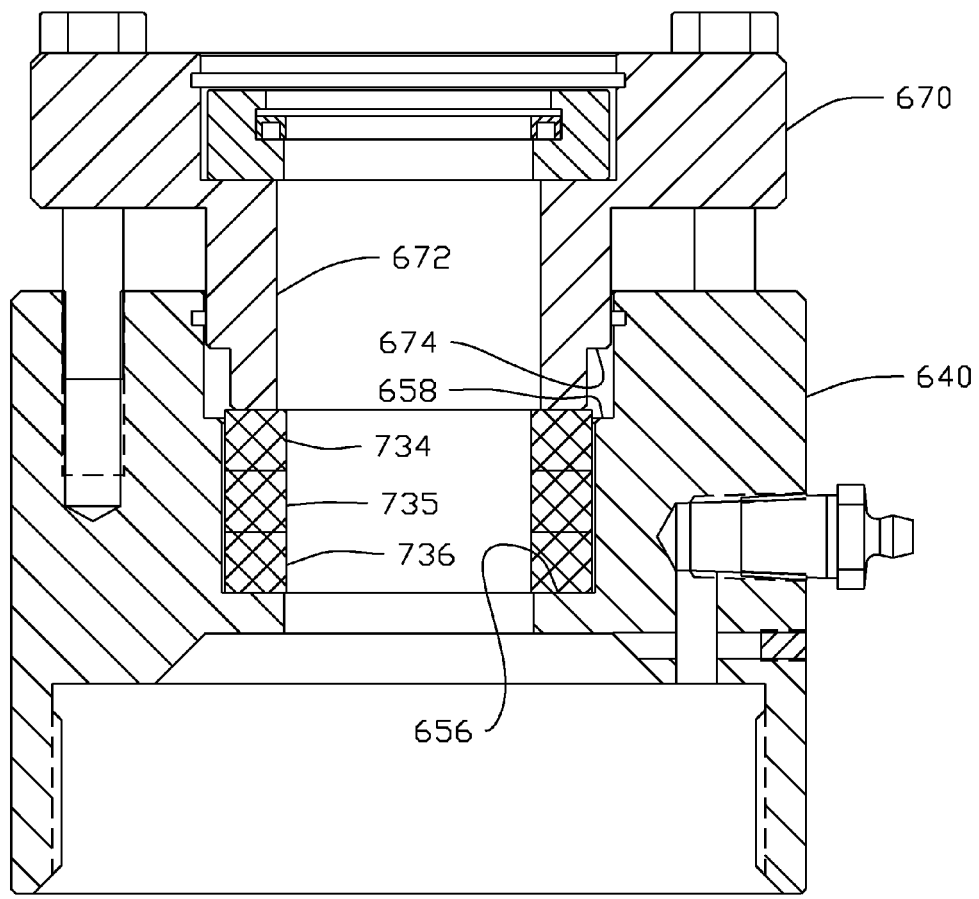
FIG. 62 is a sectional side view of the upper housing second sub-structure and top member of an exemplary embodiment of the present invention.
Figure 63:
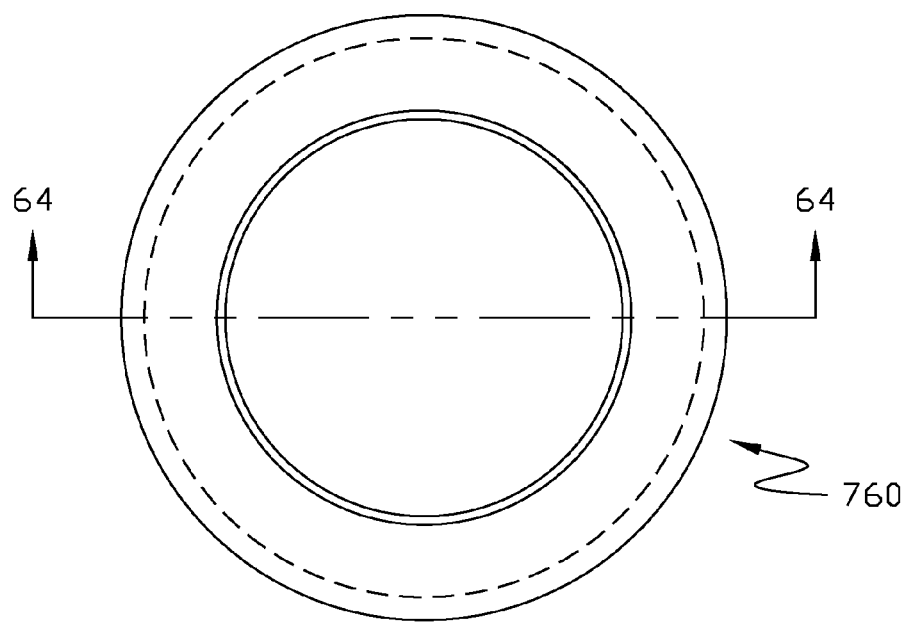
FIG. 63 is a top view of a wiper of an exemplary embodiment of the present invention.
Figure 64:
FIG. 64 is a sectional view of the wiper of FIG. 63, cut along section line 64-64 in FIG. 63.
Figure 65:
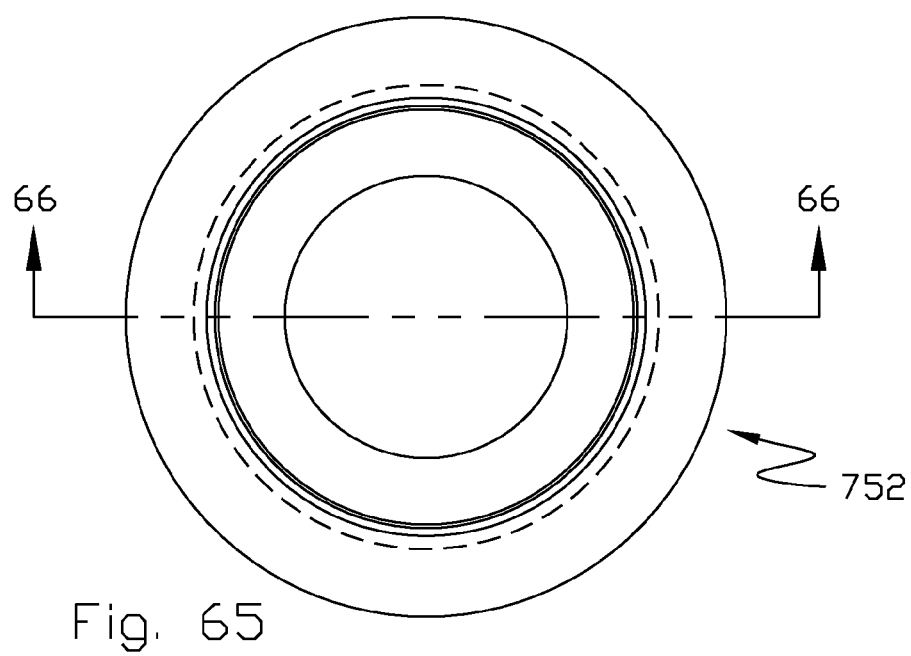
FIG. 65 is a top view of a packing cylinder bottom portion of an exemplary embodiment of the present invention.
Figure 66:
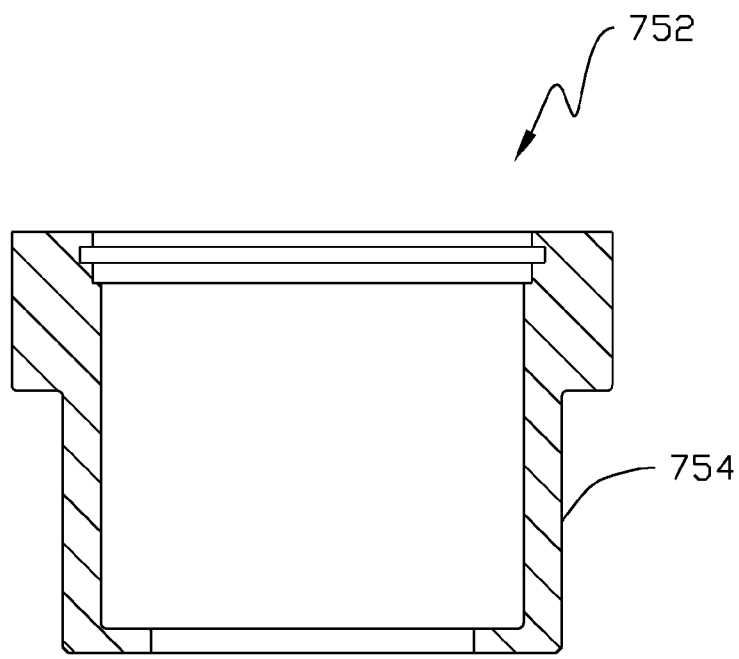
FIG. 66 is a sectional view of the packing cylinder bottom portion of FIG. 65, cut along section line 66-66 in FIG. 65.
Figure 67:
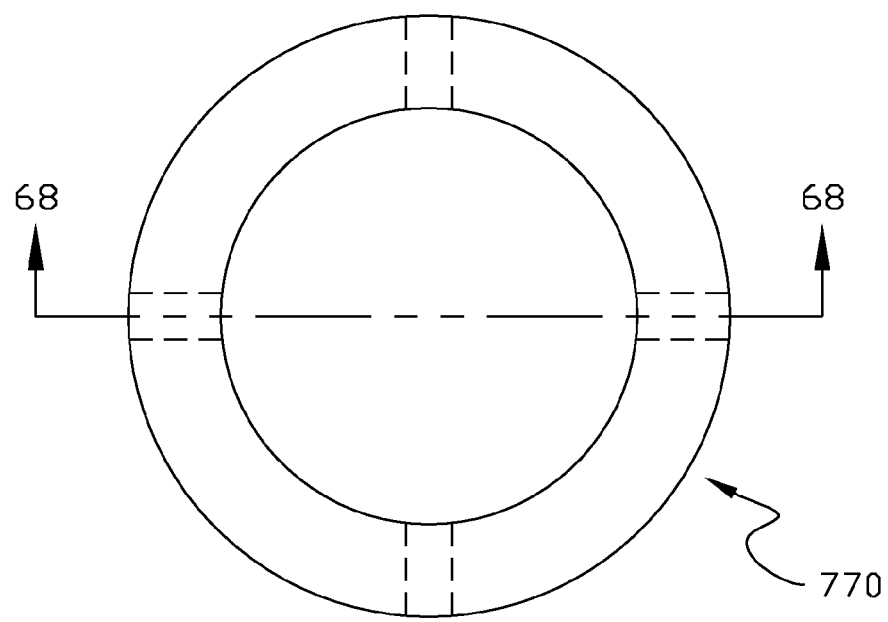
FIG. 67 is a top view of a packing cylinder support bottom portion of an exemplary embodiment of the present invention.
Figure 68:
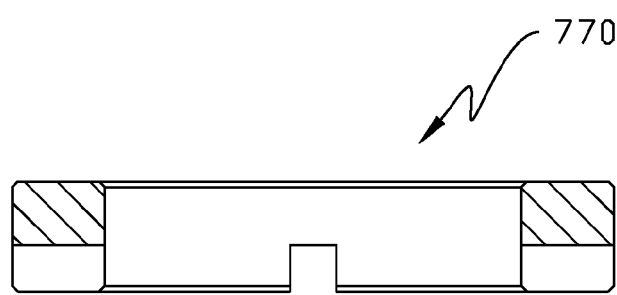
FIG. 68 is a sectional view of the packing cylinder support bottom portion of FIG. 67, cut along section line 68-68 in FIG. 67.

In some exemplary embodiments of the present invention of the type depicted in FIGS. 38-59, and as shown in more detail in FIG. 39, the seal positioner 692 rests upon first sub-structure interior shoulder 630, in the absence of barrier fluid pressure. In this position, the load ring 708 is not in contact with the second sub-structure downward facing shoulder 660. FIGS. 58-59 depict two positions of the seal positioner 692 when the barrier fluid is pressured. When barrier fluid pressures the seal positioner bottom 694 the seal positioner is displaced generally upward and, in turn, displaces the load ring 708 generally upward and causes the load ring upward facing bevel 714 to contact and bear upon the downward facing shoulder 660, thus dividing the housing upper chamber into a first sub-chamber and a second sub-chamber. The displacement of the seal positioner 692 from the upward facing shoulder 630 allows pressured barrier fluid to enter the annulus between the seal positioner 692 and the interior wall of the second sub-structure 620. Seal 722 prevents such barrier fluid from passing from such annulus to above the seal positioner 692 and load ring 708. Backup ring 724 (FIGS. 55-56) prevents extrusion of the seal 722 around the seal positioner top portion 704. FIG. 58 depicts the pressured seal positioner 692 when the polished rod is in an upright, "vertical" position. However in the field, it is common that the polished rod movement will vary from this upright position. The polished rod will tend to move laterally and move rotationally from the polished rod's vertical position, e.g. clockwise and/or counter-clockwise in the plane of FIG. 38. The smaller diameter load ring bottom portion 712 is free to move laterally with respect to the upward facing recess 706 in the seal positioner 692. This freedom, combined with the upward facing bevel 714, of the load ring 708, allows pressured displacement of the seal positioner 692 along the polished rod, even if the polished rod has been translated laterally or is in a position out of alignment with the polished rod's upright longitudinal axis. As a result the seal positioner 692 can be rotated, from its normal position, in conjunction with the polished rod, while the load ring continues to bear upon the downward facing shoulder 660. This is enabled by the load ring's upward facing bevel 714 which allows a slightly non-flush contact with the shoulder 660 to continue to allow the load ring 708 to bear upon the downward facing shoulder 660. FIG. 59 depicts such a clockwise rotation (one degree). In FIG. 58, before such polished rod rotation, the load ring 708 is shown to be substantially centered within the seal positioner recess 706. In FIG. 59, the load ring 708 is shown to be shifted to the right in the recess 706, allowing the seal positioner 692 to move with the polished rod. A clockwise rotation of approximately two degrees is possible with accompanying seal positioner displacement for exemplary embodiments of the type depicted in FIG. 57-59. (The small, partial offset of the load ring upward facing bevel 714 from the shoulder 660 is not visible due to the FIG. 59 scale.)

As shown in FIGS. 58-59, when load ring bevel 714 bears against the shoulder 660, the branch grease passage 648 allows grease to be placed in the load ring interior 710 and the grease passage 646 allows grease to be placed in the upper housing first sub-structure outside the load ring interior 710. In normal operation then, the upper housing first sub-structure interior 652 (the housing upper chamber second sub-chamber) remains unpressured by barrier fluid.

In some exemplary embodiments of the present invention of the type depicted in FIGS. 38-68, and as shown in more detail in FIGS. 38-39 and FIGS. 42-44, a packing seal 726 is positioned in the upper housing second sub-structure 640 on shoulder 656. When the top member 670 is attached, the top member downward facing shoulder 674 abuts the second sub-structure upward facing shoulder 658, and the top member bottom end 672 is positioned just above the seal 726. In some exemplary embodiments, the top member is removed (while the polished rod is still in place) and seal 726 is replaced by split seals (e.g. three split braided packing seals 734,735,736) the combined height of which extends above the second sub-structure upward facing shoulder 658, as shown in more detail in FIG. 62. During the reattachment of the top member, the increased height above the shoulder 568, the top member shoulder bottom end 672 contacts and compresses the new seals before the top member shoulder 674 is halted by the upward facing shoulder 658. The top member is reattached using the same bolts 665*a-c*.

In some exemplary embodiments of the present invention of the type shown in more detail in FIGS. 45-46 and FIGS. 60-61, the top member upward facing shoulder 678 supports, and snap ring 681 captures, a wiper holder 728 having an interior 730 and an enlarged interior portion 732 which holds a conventional polished rod wiper (not shown). In some exemplary embodiments (not shown), the top member 670 is not utilized and the wiper holder 728 is positioned upon upper housing second sub-structure upper facing shoulder 658 and secured in this position using snap ring 681 in snap ring groove 662.

In exemplary embodiments of the type depicted in FIGS. 38-68, the seal positioner 692 and the load ring 708 are constructed from bronze.

With respect to the above description then, it is to be realized that the optimum apparatus, for a particular application, will include elastomer seals, piping, fittings, hoses, barrier fluids, and other seal materials, which will occur to those skilled in the art upon review of the present disclosure.

All equivalent relationships to those illustrated in the drawings and described in the specification and claims are intended to be encompassed by the present invention. The descriptions in this specification are for purposes of illustration only and are not to be construed in a limiting sense.

I claim:

1. For a well producing well fluids, and in combination with a reciprocating plunger type pump having a polished rod, a packing unit, through which the polished rod moves, the packing unit comprising:
    a housing having a chamber and a downward facing shoulder;
    a packing assembly, positioned within the housing chamber, through which the polished rod moves, the packing assembly having:
        a packing assembly center portion, the center portion being sealed against the housing to divide the housing chamber into an upper chamber and a lower chamber, the well fluids being received in the housing lower chamber, the well fluids pressurably engaging the packing assembly center portion;
        a bottom portion, the bottom portion supporting the center portion within the housing, the housing upper chamber containing a barrier fluid, the barrier fluid pressurably engaging the packing assembly center portion; and
        a top portion, the top portion comprising:
            a load ring, through which the polished rod travels;
            a seal positioner, through which the polished rod travels, the seal positioner supporting the load ring, the load ring being laterally movable with respect to the seal positioner, the seal positioner positioning at least one packing seal element about the polished rod, the seal positioner having a bottom, the seal positioner bottom being pressurably engaged by the barrier fluid, the pressured engagement displacing the seal positioner such that the load ring is moved against the housing downward facing shoulder, the load ring bearing upon the shoulder to divide the housing upper chamber into an upper chamber first sub-chamber and an upper chamber second sub-chamber, the seal positioner being positioned in the upper chamber first sub-chamber, the second sub-chamber being separated from barrier fluid pressure; and
            at least one packing seal in the housing upper chamber second sub-chamber;
    the packing unit further comprising a pressure transmitter having a cylinder and a piston within the cylinder, the cylinder having a well fluid communication end, the well fluid communication end fluidically communicating with the housing lower chamber such that well fluid pressures the piston, the cylinder having a barrier fluid communication end, the barrier fluid communication end fluidically communicating with the housing upper chamber, such that the barrier fluid pressurably engages the piston;
    the piston being sized such that the pressure from the well fluid on the piston is transmitted to the barrier fluid, the barrier fluid being pressured in the housing upper chamber to oppose the well fluid pressure on the packing assembly center portion and to pressurably displace the seal positioner.

2. The packing unit of claim 1, further comprising a top member, through which the polished rod moves, the top member being attachable to the housing, the packing unit further comprising a wiper positioning member, supported and retained by the top member, for positioning a wiper adjacent the polished rod.

3. The packing unit of claim 2, wherein the housing has an upward facing shoulder and further wherein the top member further comprises a bottom end and downward facing shoulder, the top member bottom end being insertable within the housing upper chamber second sub-chamber such that the top member downward facing shoulder abuts the housing upward facing shoulder and further insertion of the top member is prevented, and further such that the top member bottom end is spaced from the at least one packing seal in the second sub-chamber.

4. The packing unit of claim 1, wherein the housing comprises a top structure and a bottom structure, the top structure having a bottom surface and a plurality of standoff members, the standoff members preventing the packing assembly center unit from sealing against the top structure bottom surface.

5. The packing unit of claim 1, wherein the seal positioner further comprises an upper portion, the upper portion extending radially to form a downward facing shoulder, the packing unit further comprising a seal element positioned between the seal positioner and the housing, the seal element being pressured by barrier fluids to bear against the seal positioner downward facing shoulder, the seal element providing sealing between, and preventing barrier fluid passage from, the housing upper chamber first sub-chamber into the second sub-chamber.

6. The packing unit of claim 1, wherein the housing downward facing shoulder is beveled such that the shoulder has an increasing interior diameter as the shoulder extends downwardly.

7. The packing unit of claim 1, wherein the barrier fluid pressure and the well fluid pressure are substantially balanced across the packing assembly center portion.

8. The packing unit of claim 1, wherein the barrier fluid pressure is not less than the well fluid pressure, across the packing assembly center portion.

9. The packing unit of claim 1, wherein the well has a flow line transporting produced well fluids, and further wherein the well fluid is routed from the well flow line to the pressure transmitter cylinder well fluid communication end.

10. The packing unit of claim 1, wherein the well has a casing, the well accumulating pressured gas in the casing, and further wherein the well fluid is routed from the casing to the pressure transmitter cylinder well fluid communication end.

11. The packing unit of claim 1, wherein the barrier fluid is selected from the group consisting of hydrocarbon based, vegetable based, and animal fat based fluids.

12. The packing unit of claim 1, wherein the well fluid is within the group consisting of water, oil, and hydrocarbon gas.

13. The packing unit of claim 1, wherein the polished rod deviates from a vertical orientation, and further wherein the seal positioner and load ring are sized and configured to accommodate such angular deviations such that the seal positioner floating portion at least one packing seal element remains substantially sealed against the polished rod.

14. The packing unit of claim 13, wherein the seal positioner and load ring are sized and configured to accommodate angular deviations of approximately two degrees from the vertical orientation in all directions, such that the seal positioner at least one packing seal element remains substantially sealed against the polished rod.

15. The packing unit of claim 1, wherein the polished rod deviates laterally during operation, and further wherein the seal positioner and load ring are sized and configured to accommodate lateral translations of the polished rod, such that the seal positioner at least one packing seal element remains substantially sealed against the polished rod.

16. For a well producing well fluids, and in combination with a reciprocating plunger type pump having a polished rod, a packing unit, through which the polished rod moves, the packing unit comprising:
   a housing having a chamber and a downward facing shoulder;
   packing assembly means for sealing the polished rod and preventing well fluids from leaking outside the housing from around the polished rod, the packing assembly means being positioned within the housing chamber, through which the polished rod moves, the packing assembly means comprising:
   a packing assembly center portion, the center portion being sealed against the housing to divide the housing chamber into an upper chamber and a lower chamber, the well fluids being received in the housing lower chamber, the well fluids pressurably engaging the packing assembly center portion;
   a packing assembly bottom portion, the bottom portion supporting the center portion within the housing, the housing upper chamber containing a barrier fluid, the barrier fluid pressurably engaging the packing assembly center portion; and
   a packing assembly top portion, the top portion comprising:
      a load ring, through which the polished rod travels;
      a seal positioner, through which the polished rod travels, the seal positioner supporting the load ring, the load ring being laterally movable with respect to the seal positioner, the seal positioner positioning at least one packing seal about the polished rod, the seal positioner having a bottom, the seal positioner bottom being pressurably engaged by the barrier fluid, the pressured engagement displacing the seal positioner such that the seal positioner moves the load ring against the housing downward facing shoulder, the load ring bearing upon the shoulder to divide the housing upper chamber into an upper chamber first sub-chamber and an upper chamber second sub-chamber, the seal positioner being positioned in the upper chamber first sub-chamber, the second sub-chamber being separated from barrier fluid pressure; and
      at least one packing seal in the housing upper chamber second sub-chamber;
   the packing unit further comprising a pressure transmitter having a cylinder and a piston within the cylinder, the cylinder having a well fluid communication end, the well fluid communication end fluidically communicating with the housing lower chamber such that well fluid pressures the piston, the cylinder having a barrier fluid communication end, the barrier fluid communication end fluidically communicating with the housing upper chamber, such that the barrier fluid pressurably engages the piston;
   the piston being sized such that the pressure from the well fluid on the piston is transmitted to the barrier fluid, the barrier fluid being pressured in the housing upper chamber to oppose the well fluid pressure on the packing assembly center portion and to pressurably displace the seal positioner.

17. For a well producing well fluids, and in combination with a reciprocating plunger type pump having a polished rod, a packing unit, through which the polished rod moves, the packing unit, comprising:
   a housing having a chamber and a downward facing shoulder;
   a packing assembly, positioned within the housing chamber, through which the polished rod moves, the packing assembly having:
      a packing assembly center portion, the center portion having:
      a floating portion, a fixed portion and a flexible portion, the floating portion having at least one packing seal element for sealing against the polished rod, the flexible portion attaching the floating portion to the fixed portion, the fixed portion being sealed against the housing, the floating, flexible and fixed portions cooperating to divide the housing chamber into an upper chamber and a lower chamber, the well fluids being received in the housing lower chamber, the well fluids pressurably engaging the packing assembly center portion, the flexible portion responding to variations in polished rod orientation such that the floating portion at least one packing seal element remains substantially sealed against the polished rod;

a bottom portion, the bottom portion retaining the floating portion within the housing, the housing upper chamber containing a barrier fluid, the barrier fluid pressurably engaging the packing assembly center portion; and a top portion, the top portion comprising:

a load ring, through which the polished rod travels;

a seal positioner, through which the polished rod travels, the seal positioner supporting the load ring, the load ring being laterally movable with respect to the seal positioner, the seal positioner positioning at least one packing seal about the polished rod, the seal positioner having a bottom, the seal positioner bottom being pressurably engaged by the barrier fluid, the pressured engagement displacing the seal positioner such that the seal positioner moves the load ring against the housing downward facing shoulder, the load ring bearing upon the shoulder to divide the housing upper chamber into an upper chamber first sub-chamber and an upper chamber second sub-chamber, the seal positioner being positioned in the upper chamber first sub-chamber, the second sub-chamber being separated from barrier fluid pressure; and at least one packing seal in the housing upper chamber second sub-chamber;

the packing unit further comprising a pressure transmitter having a cylinder and a piston within the cylinder, the cylinder having a well fluid communication end, the well fluid communication end fluidically communicating with the housing lower chamber such that well fluid pressures the piston, the cylinder having a barrier fluid communication end, the barrier fluid communication end fluidically communicating with the housing upper chamber, such that the barrier fluid pressurably engages the piston;

the piston being sized such that the pressure from the well fluid on the piston is transmitted to the barrier fluid, the barrier fluid being pressured in the housing upper chamber to oppose the well fluid pressure on the packing assembly center portion and to pressurably displace the seal positioner.

\* \* \* \* \*